US012394381B2

(12) United States Patent
Shan et al.

(10) Patent No.: US 12,394,381 B2
(45) Date of Patent: Aug. 19, 2025

(54) DISPLAY SUBSTRATE WITH METAL LAYERS AND DISPLAY DEVICE

(71) Applicant: BOE TECHNOLOGY GROUP CO., LTD., Beijing (CN)

(72) Inventors: Zhenzhen Shan, Beijing (CN); Jiangnan Lu, Beijing (CN); Guangliang Shang, Beijing (CN); Libin Liu, Beijing (CN); Jianchao Zhu, Beijing (CN); Xing Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/044,967

(22) PCT Filed: Jun. 29, 2022

(86) PCT No.: PCT/CN2022/102291

§ 371 (c)(1),
(2) Date: Mar. 10, 2023

(87) PCT Pub. No.: WO2024/000248

PCT Pub. Date: Jan. 4, 2024

(65) Prior Publication Data

US 2024/0290271 A1 Aug. 29, 2024

(51) Int. Cl.
*G09G 3/3258* (2016.01)

(52) U.S. Cl.
CPC ... *G09G 3/3258* (2013.01); *G09G 2300/0426* (2013.01)

(58) Field of Classification Search
CPC .............................................. G09G 2300/0426
See application file for complete search history.

(56) References Cited

U.S. PATENT DOCUMENTS

2017/0345845 A1 11/2017 Wu et al.
2020/0381461 A1 12/2020 Lin et al.
2021/0312869 A1 10/2021 Dai et al.
2022/0068212 A1 3/2022 Yao et al.
2022/0310772 A1 9/2022 Qing et al.
(Continued)

FOREIGN PATENT DOCUMENTS

CN 105807523 A 7/2016
CN 111816691 A 10/2020
CN 112838109 A 5/2021
(Continued)

*Primary Examiner* — Gustavo Polo
(74) *Attorney, Agent, or Firm* — McCoy Russell LLP

(57) ABSTRACT

A display substrate includes a driving module arranged on the base substrate, the driving module includes a plurality of driving units, and the driving unit includes a plurality of stages of driving circuits; the driving unit includes a first signal line, and the driving circuit includes an output sub-circuit; the display substrate includes at least two metal layers stacked along a direction away from the base substrate; in at least one driving unit, an orthographic projection of the first signal line on the base substrate at least partially overlaps an orthographic projection of a first electrode or a second electrode of at least one transistor included in the output sub-circuit on the base substrate, the first electrode and the second electrode are arranged on the same metal layer, and the first electrode and the first signal line are arranged on different metal layers.

20 Claims, 36 Drawing Sheets

(56) References Cited

U.S. PATENT DOCUMENTS

| | | | |
|---|---|---|---|
| 2022/0343856 | A1 | 10/2022 | Yu et al. |

FOREIGN PATENT DOCUMENTS

| | | | |
|---|---|---|---|
| CN | 113097263 | A | 7/2021 |
| CN | 113471225 | A | 10/2021 |
| CN | 113870796 | A | 12/2021 |
| CN | 215771147 | U | 2/2022 |
| KR | 20070062742 | A | 6/2007 |
| WO | 2021203422 | A1 | 10/2021 |

DISPLAY SUBSTRATE WITH METAL LAYERS AND DISPLAY DEVICE

CROSS REFERENCE TO RELATED APPLICATION

The present disclosure is the U.S. national phase of PCT Application No. PCT/CN2022/102291 filed on Jun. 29, 2022, which is incorporated herein by reference in their entireties.

TECHNICAL FIELD

The present disclosure relates to the field of display technology, in particular to a display substrate and a display device.

BACKGROUND

Active-matrix organic light-emitting diode (AMOLED) display panel is widely used in various fields due to its advantages of low power consumption, low production cost, and wide color gamut.

The AMOLED display panel includes a pixel circuit located in the display area and a driving module located in the edge area. The pixel circuit includes a plurality of pixel circuits arranged in an array. The arrangement of the driving modules determines the frame width of the AMOLED display panel.

SUMMARY

In one aspect, the present disclosure provides in some embodiments a display substrate, including a driving module arranged on a base substrate, wherein the driving module includes a plurality of driving units, and the driving unit includes a plurality of stages of driving circuit; the driving circuit is used to provide a driving signal; the driving unit includes a first signal line, and the driving circuit includes an output sub-circuit configured to output the driving signal; the display substrate includes at least two metal layers stacked along a direction away from the base substrate; in at least one driving unit, an orthographic projection of the first signal line on the base substrate at least partially overlaps an orthographic projection of a first electrode of at least one transistor included in the output sub-circuit on the base substrate, the orthographic projection of the first signal line on the base substrate at least partially overlaps an orthographic projection of a second electrode of the at least one transistor included in the output sub-circuit on the base substrate; the first electrode and the second electrode are arranged on a same metal layer, and the first electrode and the first signal line are arranged on different metal layers.

Optionally, an orthographic projection of a first signal line included in one driving circuit of the plurality of driving units on the base substrate at least partially overlaps an orthographic projection of a second signal line included in another driving unit of the plurality of driving units on the base substrate.

Optionally, the first signal line and the second signal line are configured to provide a same signal.

Optionally, the first signal line is a low voltage DC signal line, a high voltage DC signal line or a clock signal line; the second signal line is a low voltage DC signal line, a high voltage DC signal line or a clock signal line.

Optionally, among the plurality of driving units, orthographic projections of at least three signal lines on the base substrate at least partially overlap.

Optionally, the driving module includes a first driving unit; the first driving unit includes a plurality of stages of first driving circuits, and the first driving circuit is used to provide a first driving signal; the first driving unit includes a first first voltage line and a first second voltage line; the first driving circuit includes a first output sub-circuit; the first signal line is the first first voltage line; the first output sub-circuit includes a first driving transistor and a first driving reset transistor; a first electrode of the first driving transistor is electrically connected to the first second voltage line, a second electrode of the first driving transistor is electrically connected to a first electrode of the first driving reset transistor, and a second electrode of the first driving reset transistor is electrically connected to the first first voltage line; the display substrate includes a first metal layer and a second metal layer sequentially stacked along a direction away from the base substrate; the first electrode of the first driving transistor, the second electrode of the first driving transistor, the first electrode of the first driving reset transistor and the second electrode of the first driving reset transistor are both arranged on the first metal layer, and the first first voltage line is arranged on the second metal layer; an orthographic projection of the first electrode of the first driving transistor on the base substrate at least partially overlaps the orthographic projection of the first first voltage line on the base substrate; an orthographic projection of the second electrode of the first driving transistor on the base substrate at least partially overlaps the orthographic projection of the first first voltage line on the base substrate; an orthographic projection of the first electrode of the first driving reset transistor on the base substrate at least partially overlaps the orthographic projection of the first first voltage line on the base substrate; an orthographic projection of the second electrode of the first driving reset transistor on the base substrate at least partially overlaps the orthographic projection of the first first voltage line on the base substrate.

Optionally, the driving module includes a first driving unit; the first driving unit includes a plurality of stages of first driving circuits, and the first driving circuit is used to provide a first driving signal; the first driving unit includes a first first voltage line and a first second voltage line; the first driving circuit includes a first output sub-circuit; the first signal line is the first first voltage line; the first output sub-circuit includes a first driving transistor and a first driving reset transistor; a first electrode of the first driving transistor is electrically connected to the first second voltage line, a second electrode of the first driving transistor is electrically connected to a first electrode of the first driving reset transistor, and a second electrode of the first driving reset transistor is electrically connected to the first first voltage line; the display substrate includes a first metal layer, a second metal layer and a third metal layer which are sequentially stacked along a direction away from the base substrate; the first electrode of the first driving transistor, the second electrode of the first driving transistor, the first electrode of the first driving reset transistor, and the second electrode of the first driving reset transistor are all arranged on the first metal layer, and the first first voltage line is arranged on the third metal layer; an orthographic projection of the first electrode of the first driving transistor on the base substrate at least partially overlaps the orthographic projection of the first first voltage line on the base substrate; an orthographic projection of the second electrode of the first driving transistor on the base substrate at least partially overlaps the orthographic projection of the first first voltage line on the base substrate; an orthographic projection of the first electrode of the first driving reset transistor on the base substrate at least partially overlaps the orthographic projection of the first first voltage line on the base substrate; an orthographic projection of the second electrode of the first driving reset transistor on the base substrate at least partially overlaps with the orthographic projection of the first first voltage line on the base substrate.

Optionally, the first driving unit further includes a second first voltage line, a first first clock signal line, a first second clock signal line, a first second voltage line, a first start signal line and a first reset line; the first first clock signal line, the first second clock signal line and the first reset line are all arranged on the first metal layer; the second first voltage line, the first start signal line and the first second voltage line are all arranged on the second metal layer.

Optionally, the first driving circuit includes a first on-off control transistor and a second on-off control transistor; both a gate electrode of the first on-off control transistor and a gate electrode of the second on-off transistor are electrically connected to the second first voltage line; at least part of an orthographic projection of the second first voltage line on the base substrate is arranged between an orthographic projection of the gate electrode of the first on-off control transistor on the base substrate and an orthographic projection of a gate electrode of the second on-off control transistor on the base substrate.

Optionally, an orthographic projection of the first start signal line on the base substrate is arranged between an orthographic projection of the second first voltage line on the base substrate and an orthographic projection of the first reset line on the base substrate.

Optionally, the driving module includes a second driving unit; the first driving unit includes a plurality of stages of second driving circuits, and the second driving circuit is configured to provide a second driving signal; the second driving unit includes a third first voltage line; the second driving circuit includes a second output sub-circuit; the second output sub-circuit includes a second driving transistor; an orthographic projection of the third first voltage line on the base substrate is arranged on a side of an orthographic projection of the second driving transistor on the base substrate away from a display area; the third first voltage line and the first first voltage line are arranged on different layers; an orthographic projection of the third first voltage line on the base substrate at least partially overlaps the orthographic projection of the first first voltage line on the base substrate.

Optionally, the orthographic projection of the third first voltage line on the base substrate coincides with the orthographic projection of the first first voltage line on the base substrate.

Optionally, the first driving circuit is configured to provide an N-type gate driving signal, and the second driving circuit is configured to provide a reset control signal.

Optionally, the first first voltage line is arranged on the second metal layer, and the third first voltage line is arranged on the third metal layer; or, the first first voltage line is arranged on the third metal layer, and the third first voltage line is arranged on the second metal layer.

Optionally, the first first voltage line and the third first voltage line are low-voltage DC signal lines; or, the first first voltage line and the third first voltage line are high-voltage DC signal lines.

Optionally, the second output sub-circuit is arranged adjacent to the third first voltage line.

Optionally, the second driving unit further comprises a second start signal line, a second first clock signal line, a second second clock signal line and a second second voltage line; the third first voltage line, the second start signal line, the second first clock signal line, the second second clock signal line and the second second voltage line are arranged in sequence along a direction close to the display area.

Optionally, the second output sub-circuit further includes a second driving reset transistor; an orthographic projection of the second start signal line on the base substrate at least partially overlaps the orthographic projection of the first electrode of the second driving transistor on the base substrate, and the orthographic projection of the second start signal line on the base substrate at least partially overlaps the orthographic projection of the second electrode of the second driving transistor on the base substrate; the orthographic projection of the second start signal line on the base substrate at least partially overlaps an orthographic projection of a first electrode of the second driving reset transistor on the base substrate, and the orthographic projection of the second start signal line on the base substrate at least partially overlaps an orthographic projection of a second electrode of the second driving reset transistor on the base substrate.

Optionally, an orthographic projection of a transistor included in the second driving circuit on the base substrate is arranged at a side of an orthographic projection of the third first voltage line on the base substrate close to the display area.

Optionally, the second driving circuit further comprises a fifteenth transistor, a twentieth transistor, and a twenty-first transistor; a gate electrode of the fifteenth transistor is electrically connected to the second first clock signal line, and a second electrode of the fifteenth transistor is electrically connected to a second electrode of the twenty-first transistor; a first electrode of the twenty-first transistor is electrically connected to a second electrode of the twentieth transistor; a gate electrode of the twentieth transistor is electrically connected to the gate electrode of the second driving reset transistor, and a gate electrode of the twenty-first transistor is electrically connected to the second second clock signal line; an orthographic projection of the gate electrode of the fifteenth transistor on the base substrate, an orthographic projection of the gate electrode of the twentieth transistor on the base substrate, and an orthographic projection of the gate electrode of the twenty-first transistor on the base substrate are arranged between the orthographic projection of the second second clock signal line on the base substrate and the orthographic projection of the second second voltage line on the base substrate.

Optionally, the second driving circuit further comprises a sixteenth transistor; a gate electrode of the sixteenth transistor is electrically connected to the second electrode of the fifteenth transistor, a first electrode of the sixteenth transistor is electrically connected to the second first clock signal line, and a second electrode of the sixteenth transistor is electrically connected to the gate electrode of the driving reset transistor; an orthographic projection of the gate electrode of the sixteenth transistor on the base substrate is arranged between the orthographic projection of the second first clock signal line on the base substrate and the orthographic projection of the second second clock signal line on the base substrate.

Optionally, the base substrate includes a peripheral area and a display area; the driving units included in the driving module are all arranged in the peripheral area of the base substrate; the first driving unit is arranged on a side of the second driving unit away from the display area.

Optionally, the driving module comprises a third driving unit, the third driving circuit includes a plurality of stages of third driving circuits, the third driving circuit is configured to provide a third driving signal, the third driving unit is arranged at a side of the first driving unit far away from the second driving unit.

Optionally, the driving module comprises a fourth driving unit, the driving unit comprises a plurality of stages of fourth driving circuits, the fourth driving circuit is configured to provide a fourth driving signal; the fourth driving unit is arranged on a side of the second driving unit close to the display area.

In a second aspect, a display device includes the display substrate.

DETAILED DESCRIPTION

Figure 1:
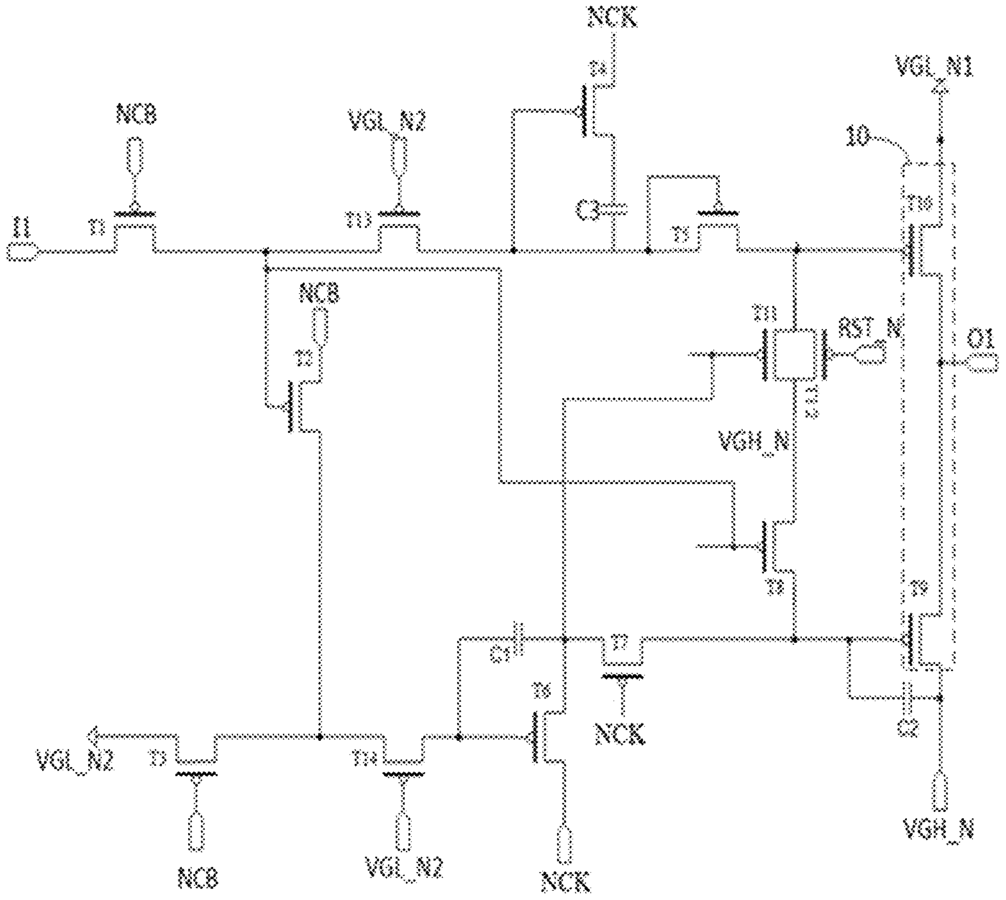
FIG. 1 is a circuit diagram of a first driving circuit in a display substrate according to at least one embodiment of the present disclosure.

The following will clearly and completely describe the technical solutions in the embodiments of the present disclosure with reference to the accompanying drawings.

Apparently, the described embodiments are only some of the embodiments of the present disclosure, not all of them. Based on the embodiments in the present disclosure, all other embodiments obtained by persons of ordinary skill in the art without creative efforts belong to the protection scope of the present disclosure.

The transistors used in all the embodiments of the present disclosure may be triodes, thin film transistors or field effect transistors or other devices with the same characteristics. In the embodiments of the present disclosure, in order to distinguish the two electrodes of the transistor except the gate electrode, one electrode is called the first electrode, and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

The display substrate described in the embodiment of the present disclosure includes a driving module arranged on the base substrate, the driving module includes a plurality of driving units, and the driving unit includes a plurality of stages of driving circuit; the driving circuit is used to provide a driving signal;

The driving unit includes a first signal line, and the driving circuit includes an output sub-circuit configured to output the driving signal;

The display substrate includes at least two metal layers stacked along a direction away from the base substrate;

In at least one driving unit, an orthographic projection of the first signal line on the base substrate at least partially overlaps an orthographic projection of a first electrode of at least one transistor included in the output sub-circuit on the base substrate, the orthographic projection of the first signal line on the base substrate at least partially overlaps an orthographic projection of a second electrode of the at least one transistor included in the output sub-circuit on the base substrate;

The first electrode and the second electrode are arranged on the same metal layer, and the first electrode and the first signal line are arranged on different metal layers.

The display substrate described in the embodiment of the present disclosure includes a driving module, and in at least one driving unit included in the driving module, the first electrode and the second electrode are arranged on the same metal layer, and the first electrode and the first signal line are arranged on different metal layers; the orthographic projection of the first signal line on the base substrate at least partially overlaps the orthographic projection of the first electrode of the at least one transistor included in the output sub-circuit on the base substrate, the orthographic projection of the first signal line on the base substrate at least partially overlaps the orthographic projection of the second electrode of the at least one transistor included in the output sub-circuit on the base substrate, so as to reduce the width of the display substrate in the first direction, which is conducive to realizing a narrow frame.

In at least one embodiment of the present disclosure, the first direction may be an extending direction of the gate lines, for example, the first direction may be a horizontal direction, but not limited thereto.

In at least one embodiment of the present disclosure, the orthographic projection of the first signal line included in one of the plurality of driving units on the base substrate at least partially overlaps the orthographic projection of the second signal lines included in another driving unit of the plurality of driving units on the base substrate.

During specific implementation, the orthographic projection of the first signal line on the base substrate at least partially overlaps the orthographic projection of the second signal line on the base substrate, so as to reduce the width of the display substrate in the first direction, which is conducive to achieving narrow borders.

Optionally, the first signal line and the second signal line are configured to provide the same signal.

Optionally, the first signal line is a low-voltage DC signal line, a high-voltage DC signal line or a clock signal line;

The second signal line is a low voltage DC signal line, a high voltage DC signal line or a clock signal line.

In at least one embodiment of the present disclosure, the first signal line and the second signal line may be configured to provide the same signal, for example, the first signal line and the second signal line may both be low voltage DC signal line, or both the first signal line and the second signal line may be high-voltage DC signal lines, or both the first signal line and the second signal line may be clock signal lines; but not limited to this.

In specific implementation, the first signal line and the second signal line can also be configured to provide different signals, for example, the first signal line can be a low-voltage DC signal line, and the second signal line may be a high-voltage DC signal line; or, the first signal line may be a clock signal line, and the second signal line may be a high-voltage DC signal line; or, the first signal line may be a clock signal line, the second signal line may be a low-voltage DC signal line; but not limited thereto.

In at least one embodiment of the present disclosure, among the plurality of driving units, orthographic projections of at least three signal lines on the base substrate at least partially overlap.

In a specific implementation, among the plurality of driving units, the orthographic projections of at least three signal lines on the base substrate at least partially overlap, so as to reduce the width of the display substrate in the first direction, which facilitates the narrow frame.

In at least one embodiment of the present disclosure, the driving module includes a first driving unit; the first driving unit includes a plurality of stages first driving circuit, and the first driving circuit is used to provide a first driving signal; the first driving unit includes a first first voltage line and a first second voltage line; the first driving circuit includes a first output sub-circuit; the first signal line is the first first voltage line;

The first output sub-circuit includes a first driving transistor and a first driving reset transistor;

A first electrode of the first driving transistor is electrically connected to the first second voltage line, a second electrode of the first driving transistor is electrically connected to the first electrode of the first driving reset transistor, and a second electrode of the first driving reset transistor is electrically connected to the first first voltage line;

The display substrate includes a first metal layer and a second metal layer sequentially stacked along a direction away from the base substrate; the first electrode of the first driving transistor, the second electrode of the first driving transistor, the first electrode of the first driving reset transistor and the second electrode of the first driving reset transistor are both arranged on the first metal layer, and the first first voltage line is arranged on the second metal layer;

The orthographic projection of the first electrode of the first driving transistor on the base substrate at least partially overlaps the orthographic projection of the first first voltage line on the base substrate; the orthographic projection of the second electrode of the first driving transistor on the base substrate at least partially overlaps the orthographic projection of the first first voltage line on the base substrate; the orthographic projection of the first electrode of the first driving reset transistor on the base substrate at least partially overlaps the orthographic projection of the first first voltage line on the base substrate; the orthographic projection of the second electrode of the first driving reset transistor on the base substrate at least partially overlaps with the orthographic projection of the first first voltage line on the base substrate.

Optionally, the first driving unit is used to provide a first driving signal, the first driving signal may be an N-type gate driving signal, and the N-type gate driving signal may be provided to the N-type transistors included in the pixel circuit and having a valid high-level, but not limited thereto.

In at least one embodiment of the present disclosure, the first driving transistor and the first driving reset transistor may be arranged along a second direction;

The second direction may be the extending direction of the first first voltage line, for example, the second direction may be a vertical direction, but not limited thereto.

Optionally, the first voltage line may be a low voltage line, and the second voltage line may be a high voltage line, but not limited thereto.

In at least one embodiment of the present disclosure, the driving module includes a first driving unit; the first driving unit includes a plurality of stages of first driving circuits, and the first driving circuit is used to provide a first driving signal; the first driving unit includes a first first voltage line and a first second voltage line; the first driving circuit includes a first output sub-circuit; the first signal line is the first first voltage line;

The first output sub-circuit includes a first driving transistor and a first driving reset transistor;

The first electrode of the first driving transistor is electrically connected to the first second voltage line, the second electrode of the first driving transistor is electrically connected to the first electrode of the first driving reset transistor, and the second electrode of the first driving reset transistor is electrically connected to the first first voltage line;

The display substrate includes a first metal layer, a second metal layer and a third metal layer which are sequentially stacked along a direction away from the base substrate; the first electrode of the first driving transistor, the second electrode of the first driving transistor, the first electrode of the first driving reset transistor, and the second electrode of the first driving reset transistor are all arranged on the first metal layer, and the first first voltage line is arranged on the second metal layer or the third metal layer;

The orthographic projection of the first electrode of the first driving transistor on the base substrate at least partially overlaps the orthographic projection of the first first voltage line on the base substrate; the orthographic projection of the second electrode of the first driving transistor on the base substrate at least partially overlaps the orthographic projection of the first first voltage line on the base substrate; the orthographic projection of the first electrode of the first driving reset transistor on the base substrate at least partially overlaps the orthographic projection of the first first voltage line on the base substrate; the orthographic projection of the second electrode of the first driving reset transistor on the base substrate at least partially overlaps with the orthographic projection of the first first voltage line on the base substrate, so as to reduce the width of the display substrate along the first direction, which is beneficial to realize a narrow frame.

In specific implementation, the display substrate may include three metal layers, the first electrode of the first driving transistor, the second electrode of the first driving transistor, the first electrode of the first driving reset transistor, and the second electrode of the first driving reset transistor are all arranged on the first metal layer, and the first first voltage line can be arranged on the second metal layer or the third metal layer.

In at least one embodiment of the present disclosure, the first metal layer may be a first source-drain metal layer, the second metal layer may be a second source-drain metal layer, and the third metal layer may be a third source-drain metal layer, but not limited thereto.

As shown in FIG. 1, at least one embodiment of the first driving circuit includes a first output sub-circuit 10;

The first output sub-circuit 10 includes a first driving transistor T9 and a first driving reset transistor T10;

The first driving circuit further includes a first transistor T1, a second transistor T2, a third transistor T3, a fourth transistor T4, a fifth transistor T5, a sixth transistor T6, a seventh transistor T7, an eighth transistor T8, an eleventh transistor T11, a twelfth transistor T12, a first on-off control transistor T13, a second on-off control transistor T14, a first capacitor C1, a second capacitor C2 and a third capacitor C3;

The gate electrode of T1 is electrically connected to the first second clock signal line NCB, the first electrode of T1 is electrically connected to the first input terminal I1, and the second electrode of T1 is electrically connected to the gate electrode of T2;

The first electrode of T2 is electrically connected to the first second clock signal line NCB, and the second electrode of T2 is electrically connected to the second electrode of T3;

The gate electrode of T3 is electrically connected to the first second clock signal line NCB, and the first electrode of T3 is electrically connected to the second first voltage line VGL_N2;

The gate electrode of T4 is electrically connected to the gate electrode of T5, the first electrode of T4 is electrically connected to the first first clock signal line NCK, the second electrode of T4 is electrically connected to the first electrode plate of C3; the second electrode plate of C3 is electrically connected to the gate electrode of T5;

The gate electrode of T5 is electrically connected to the first electrode of T5, and the second electrode of T5 is electrically connected to the gate electrode of T10;

The gate electrode of T6 is electrically connected to the first electrode plate of C1, the first electrode of T6 is electrically connected to the first first clock signal line NCK, and the second electrode of T6 is electrically connected to the second electrode plate of C1;

The gate electrode of T7 is electrically connected to the first first clock signal line NCK, the first electrode of T7 is electrically connected to the second electrode plate of C1, and the second electrode of T7 is electrically connected to the gate electrode of T9;

The gate electrode of T8 is electrically connected to the gate electrode of T2, the first electrode of T8 is electrically connected to the first second voltage line VGH_N, and the second electrode of T8 is electrically connected to the gate electrode of T9;

The first electrode of T9 is electrically connected to the first second voltage line VGH_N, and the second electrode of T9 is electrically connected to the first driving signal output terminal O1;

The first electrode of T10 is electrically connected to the first driving signal output terminal O1, and the second electrode of T10 is electrically connected to the first first voltage line VGL_N1;

The gate electrode of T11 is electrically connected to the second electrode of T6, the first electrode of T11 is electrically connected to the first second voltage line VGH_N, and the second electrode of T11 is electrically connected to the gate electrode of T10;

The gate electrode of T12 is electrically connected to the first reset line RST_N, the first electrode of T12 is electrically connected to the first second voltage line VGH_N, and the second electrode of T12 is electrically connected to the gate electrode of T10;

The gate electrode of T13 is electrically connected to the second first voltage line VGL_N2, the first electrode of T13 is electrically connected to the gate electrode of T2, and the second electrode of T13 is electrically connected to the gate electrode of T4;

The gate electrode of T14 is electrically connected to the second first voltage line VGL_N2, the first electrode of T14 is electrically connected to the second electrode of T2, and the second electrode of T14 is electrically connected to the gate electrode of T6;

The first electrode plate of C2 is electrically connected to the gate electrode of T9, and the second electrode plate of C2 is electrically connected to the first second voltage line VGH_N.

In at least one embodiment shown in FIG. 1, T9 may be the ninth transistor included in the first driving circuit, and T10 may be the tenth transistor included in the first driving circuit; T13 may be a thirteenth transistor included in the first driving circuit, and T14 may be a fourteenth transistor included in the first driving circuit;

All transistors included in at least one embodiment of the first driving circuit shown in FIG. 1 may be P-type transistors, but not limited thereto.

In at least one embodiment of the present disclosure, each first voltage line may be a low-voltage DC signal line, and each second voltage line may be a high-voltage DC signal line, but not limited thereto.

Figure 2:
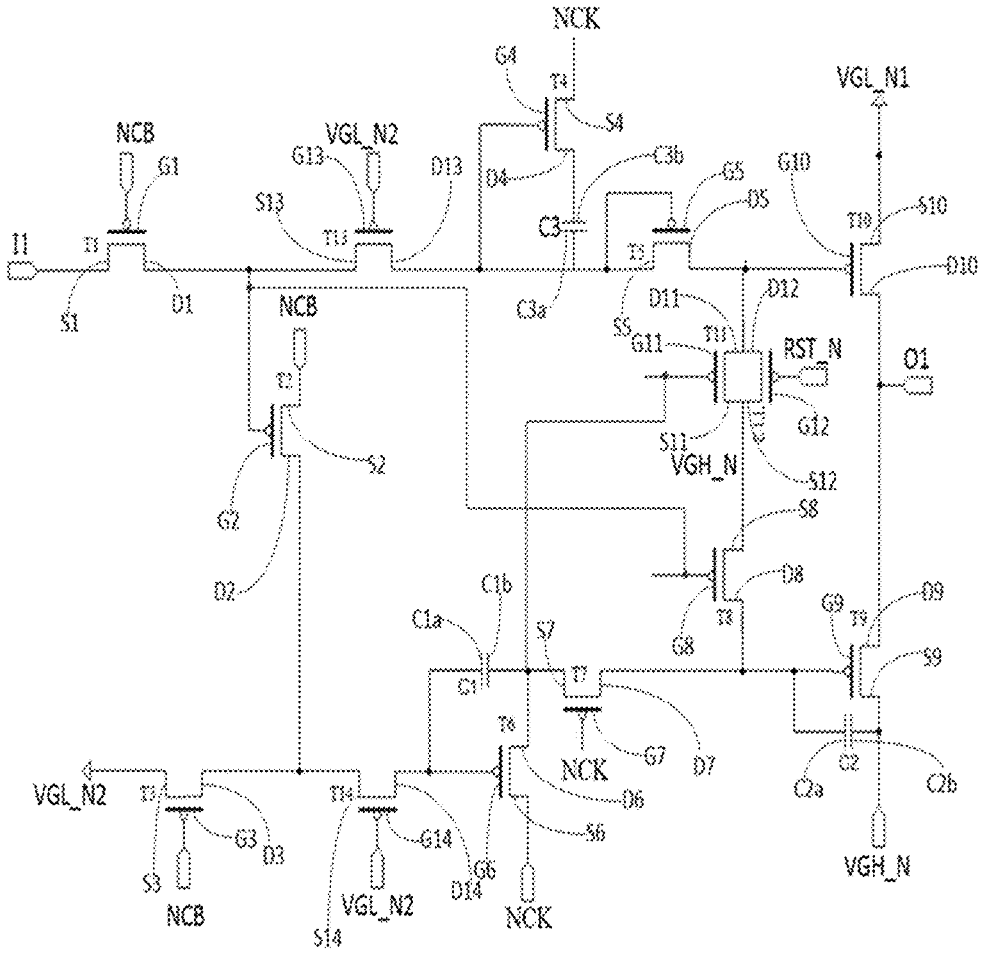
FIG. 2 is a circuit diagram of a first driving circuit in a display substrate according to at least one embodiment of the present disclosure.

FIG. 2 is a schematic diagram of labeling each electrode and each electrode plate on the basis of FIG. 1.

As shown in FIG. 2, the first driving circuit includes a first output sub-circuit 10;

The first output sub-circuit 10 includes a first driving transistor T9 and a first driving reset transistor T10;

The first driving circuit further includes a first transistor T1, a second transistor T2, a third transistor T3, a fourth transistor T4, a fifth transistor T5, a sixth transistor T6, a seventh transistor T7, an eighth transistor T8, an eleventh transistor T11, a twelfth transistor T12, a first on-off control transistor T13, a second on-off control transistor T14, a first capacitor C1, a second capacitor C2 and a third capacitor C3;

The gate electrode G1 of T1 is electrically connected to the first second clock signal line NCB, the first electrode S1 of T1 is electrically connected to the first input terminal I1, and the second electrode D1 of T1 is electrically connected to the gate electrode G2 of T2;

The first electrode S2 of T2 is electrically connected to the first second clock signal line NCB, and the second electrode D2 of T2 is electrically connected to the second electrode D3 of T3;

The gate electrode G3 of T3 is electrically connected to the first second clock signal line NCB, and the first electrode S3 of T3 is electrically connected to the second first voltage line VGL_N2;

The gate electrode G4 of T4 is electrically connected to the gate electrode G5 of T5, the first electrode S4 of T4 is electrically connected to the first first clock signal line NCK, and the second electrode D4 of T4 is electrically connected to the first electrode plate C3*a* of C3; the second electrode plate C3*b* of C3 is electrically connected to the gate electrode G5 of T5;

The gate electrode G5 of T5 is electrically connected to the first electrode S5 of T5, and the second electrode D5 of T5 is electrically connected to the gate electrode G10 of T10;

The gate electrode G6 of T6 is electrically connected to the first electrode plate C1*a* of C1, the first electrode S6 of T6 is electrically connected to the first first clock signal line NCK, and the second electrode D6 of T6 is electrically connected to the second electrode plate C1*b* of C1;

The gate electrode G7 of T7 is electrically connected to the first first clock signal line NCK, the first electrode S7 of T7 is electrically connected to the second electrode plate C1*b* of C1, and the second electrode D7 of T7 is electrically connected to the gate electrode G9 of T9;

The gate electrode G8 of T8 is electrically connected to the gate electrode G2 of T2, the first electrode S8 of T8 is electrically connected to the first second voltage line VGH_N, and the second electrode D8 of T8 is electrically connected to the gate electrode G9 of T9;

The first electrode S9 of T9 is electrically connected to the first second voltage line VGH_N, and the second electrode D9 of T9 is electrically connected to the first driving signal output terminal O1;

The first electrode S10 of T10 is electrically connected to the first driving signal output terminal O1, and the second electrode D10 of T10 is electrically connected to the first first voltage line VGL_N1;

The gate electrode G11 of T11 is electrically connected to the second electrode of T6, the first electrode S11 of T11 is electrically connected to the first second voltage line VGH_N, and the second electrode D11 of T11 is electrically connected to the gate electrode of T10;

The gate electrode G12 of T12 is electrically connected to the first reset line RST_N, the first electrode S12 of T12 is electrically connected to the first second voltage line VGH_N, and the second electrode D12 of T12 is electrically connected to the gate electrode G10 of T10;

The gate electrode G13 of T13 is electrically connected to the second first voltage line VGL_N2, the first electrode S13 of T13 is electrically connected to the gate electrode G2 of T2, and the second electrode D13 of T13 is electrically connected to the gate electrode G4 of T4;

The gate electrode G14 of T14 is electrically connected to the second first voltage line VGL_N2, the first electrode S14 of T14 is electrically connected to the second electrode D2 of T2, and the second electrode D14 of T14 is electrically connected to the gate electrode G6 of T6;

The first electrode plate C2*a* of C2 is electrically connected to the gate electrode G9 of T9, and the second electrode plate C2*b* of C2 is electrically connected to the first second voltage line VGH_N.

Figure 3:
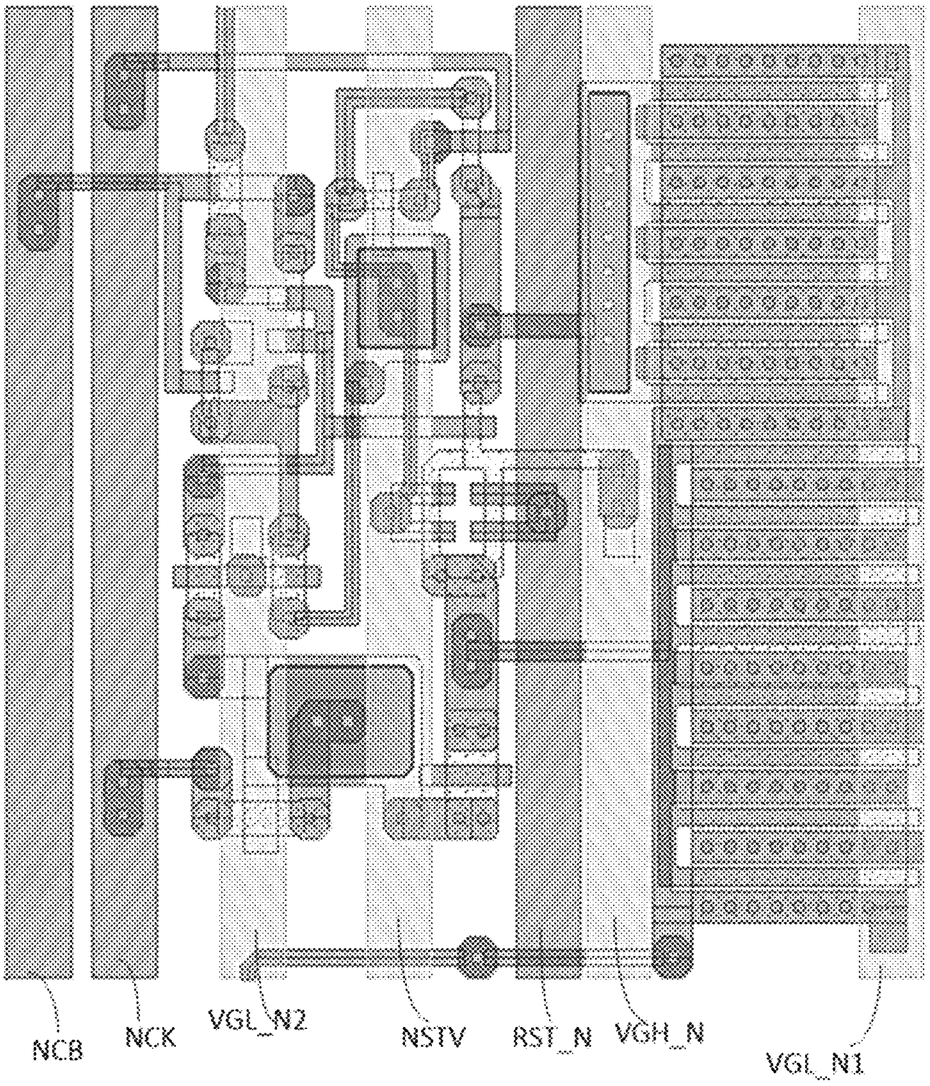
FIG. 3 is a layout diagram corresponding to the first driving circuit shown in FIG. 2.

FIG. 3 is a layout diagram corresponding to the first driving circuit shown in FIG. 2.

In FIG. 3, the one labeled VGL_N1 is the first first voltage line, the one labeled VGL_N2 is the second first voltage line, the one labeled VGH_N is the first second voltage line, and the one labeled NCK is the first first clock signal line, the one labeled NCB is the first second clock signal line, the one labeled NSTV is the first start signal line, and the one labeled RST_N is the first reset line.

Figure 4:
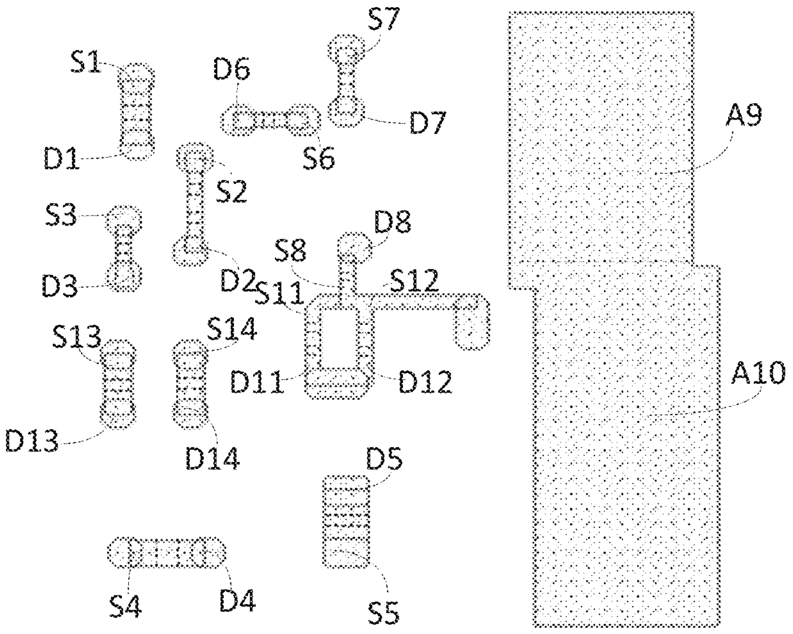
FIG. 4 is a layout diagram of the semiconductor layer in FIG. 3.
Figure 5:
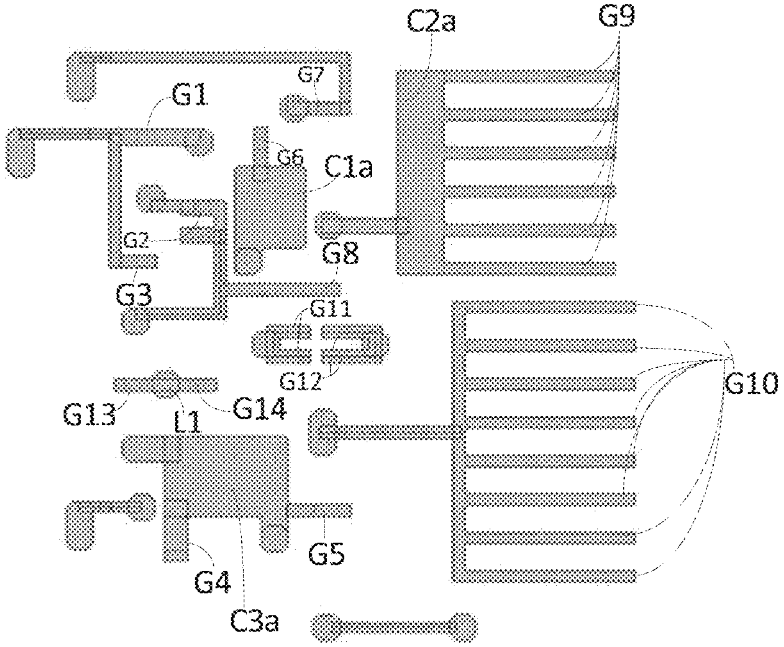
FIG. 5 is a layout diagram of the first gate metal layer in FIG. 3.
Figure 6:
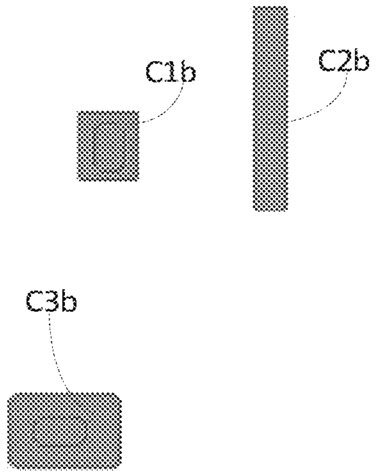
FIG. 6 is a layout diagram of the second gate metal layer in FIG. 3.
Figure 7:
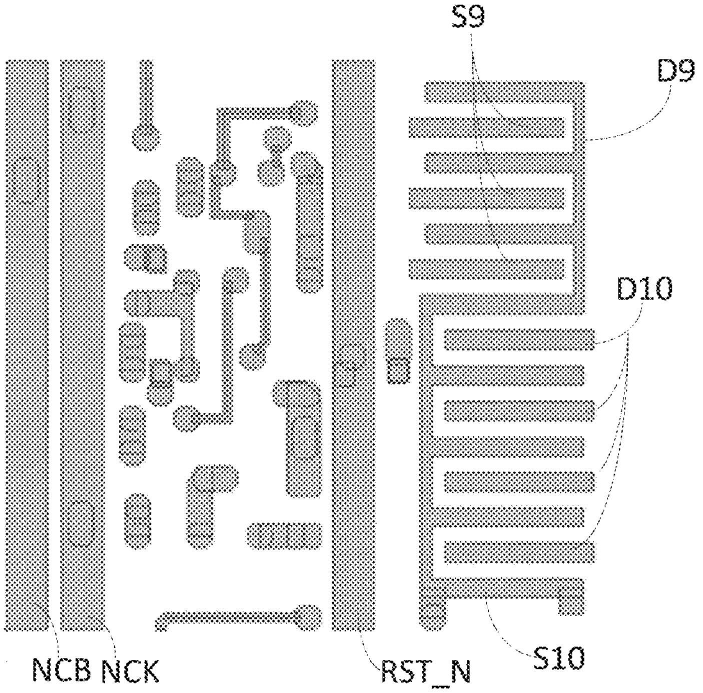
FIG. 7 is a layout diagram of the first metal layer in FIG. 3.
Figure 8:
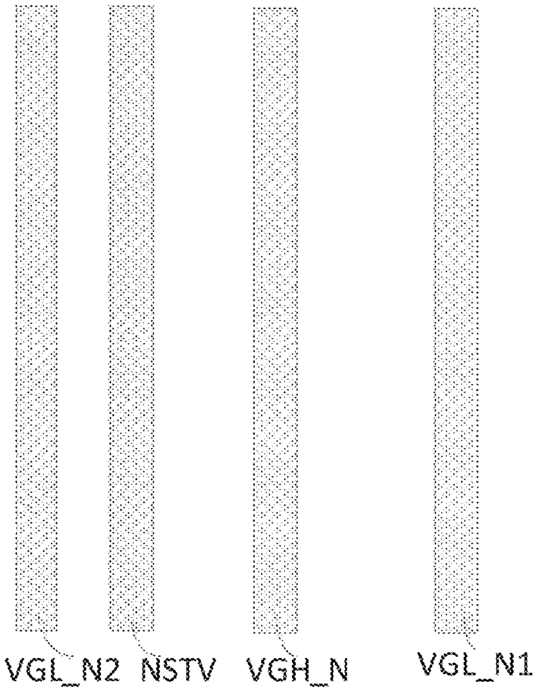
FIG. 8 is a layout diagram of the second metal layer in FIG. 3.

FIG. 4 is a layout diagram of the semiconductor layer in FIG. 3, FIG. 5 is a layout diagram of the first gate metal layer in FIG. 3, FIG. 6 is a layout diagram of the second gate metal layer in FIG. 3, and FIG. 7 is the layout diagram of the first metal layer in FIG. 3, FIG. 8 is the layout diagram of the second metal layer in FIG. 3.

In at least one embodiment of the first driving circuit shown in FIGS. 3-8, T2, T11 and T12 are double-gate transistors, but not limited thereto.

In FIG. 7, the one labeled S9 is the first electrode of T9, the one labeled D9 is the second electrode of T9, the one labeled S10 is the first electrode of T10, and the one labeled D10 is the second electrode of T10;

As shown in FIG. 3-FIG. 8, the orthographic projection of S9 on the base substrate partially overlaps the orthographic projection of VGL_N1 on the base substrate, and the orthographic projection of D9 on the base substrate partially overlaps the orthographic projection of VGL_N1 on the base substrate, the orthographic projection of S10 on the base substrate partially overlaps the orthographic projection of VGL_N1 on the base substrate, and the orthographic projection of D10 on the base substrate partially overlaps the orthographic projection of VGL_N1 on the base substrate, so as to reduce the width of the display substrate along the horizontal direction, which is conducive to realizing a narrow frame.

Optionally, the first driving unit further includes a second first voltage line, a first first clock signal line, a first second clock signal line, a first second voltage line, a first start signal line and the first reset line;

The first first clock signal line, the first second clock signal line and the first reset line are all arranged on the first metal layer;

The second first voltage line, the first start signal line and the first second voltage line are all arranged on the second metal layer.

As shown in FIG. 8, the first first voltage line VGL_N1, the second first voltage line VGL_N2, the first start signal line NSTV and the first second voltage line VGH_N are all arranged on the second metal layer;

As shown in FIG. 7, the first first clock signal line NCK, the first second clock signal line NCB and the first reset line RST_N are all arranged on the first metal layer;

As shown in FIG. 3-FIG. 8, the orthographic projection of NCB on the base substrate, the orthographic projection of NCK on the base substrate, the orthographic projection of VGL_N2 on the base substrate, the orthographic projection of NSTV on the base substrate, the orthographic projection of RST_N on the base substrate, the orthographic projection of VGH_N on the base substrate and the orthographic projection of VGL_N1 on the base substrate are arranged in sequence along a direction close to the display area;

NCB, NCK, VGL_N2, NSTV, RST_N, VGH_N and VGL_N1 may all extend along the vertical direction, but not limited thereto.

As shown in FIG. 3-FIG. 8, G9 and G10 are arranged along the vertical direction.

Optionally, the first driving circuit includes a first on-off control transistor and a second on-off control transistor;

Both the gate electrode of the first on-off control transistor and the gate electrode of the second on-off transistor are electrically connected to the second first voltage line;

At least part of the orthographic projection of the second first voltage line on the base substrate is arranged between the orthographic projection of the gate electrode of the first on-off control transistor on the base substrate and the orthographic projection of the gate electrode of the on-off control transistor on the base substrate.

As shown in FIGS. 3-8, the gate electrode G13 of the first on-off control transistor T13 and the gate electrode G14 of the second on-off control transistor T14 are electrically connected to each other through the first conductive connection portion L1;

The first conductive connection portion L1 is electrically connected to VGL_N2 through a via hole;

The part of the orthographic projection of VGL_N2 on the base substrate is arranged between the orthographic projection of G13 on the base substrate and the orthographic projection of G14 on the base substrate, so that G13 and G14 are electrically connected to VGL_N2, and VGL_N2 is set in the space between G13 and G14, to reduce the width of the display substrate along the horizontal direction and realize the narrow frame.

In at least one embodiment of the present disclosure, the orthographic projection of the first start signal line on the base substrate is set between the orthographic projection of the second first voltage line on the base substrate and the orthographic projection of the first reset line on the base substrate.

As shown in FIG. 3-FIG. 8, the orthographic projection of NSTV on the base substrate is set between the orthographic projection of VGL_N2 on the base substrate and the orthographic projection of RST_N on the base substrate, so as to utilize the space between VGL_N2 and RST_N to set NSTV, which is beneficial to reducing the width of the display substrate along the horizontal direction and realizing narrow frame.

As shown in FIG. 3-FIG. 8, the orthographic projection of the first electrode plate C1*a* of C1 on the base substrate partially overlaps the orthographic projection of NSTV on the base substrate, and the orthographic projection of the second electrode plate C1*b* of C1 on the base substrate partially overlaps the orthographic projection of the NSTV on the base substrate;

The orthographic projection of the first electrode plate C3*a* of C3 on the base substrate partially overlaps the orthographic projection of NSTV on the base substrate, and the orthographic projection of the second electrode plate C3*b* of C3 on the base substrate partially overlaps the orthographic projection of NSTV on the base substrate;

The orthographic projection of gate electrode G6 of T6 on the base substrate is included in the orthographic projection of NSTV on the base substrate.

As shown in FIG. 3-FIG. 8, T1, T3 and T14 are arranged in sequence along the vertical direction, T7, T8 and T5 are arranged in sequence along the vertical direction, and T9 and T10 are arranged in sequence along the vertical direction.

As shown in FIG. 3-FIG. 8, the first electrode plate of each capacitor and the gate electrode of each transistor are arranged on the first gate metal layer, the second electrode plate of each capacitor is arranged on the second gate metal layer, and the active layer of each transistor is arranged on the semiconductor layer.

In FIG. 4, the one labeled A9 is the active layer of T9, the one labeled A10 is the active layer of T10, the one labeled S1 is the first electrode of T1, and the one labeled D1 is the second electrode of T1; the one labeled S2 is the first electrode of T2, the one labeled D2 is the second electrode of T2; the one labeled S3 is the first electrode of T3, the one labeled D3 is the second electrode of T3; the one labeled S4 is the first electrode of T4, the one labeled D4 is the second electrode of T4; the one labeled S5 is the first electrode of T5, the one labeled D5 is the second electrode of T5; the one labeled S6 is the first electrode of T6, the one labeled D6 is the second electrode of T6; the one labeled S7 is the first electrode of T7, the one labeled D7 is the second electrode of T7; the one labeled S8 is the first electrode of T8, and the one labeled D8 is the second electrode of T8; the one labeled S11 is the first electrode of T11, the one labeled D11 is the second electrode of T11; the one labeled S12 is the first electrode of T12, and the one labeled D12 is the second electrode of T12; the one labeled S13 is the first electrode of T13, the one labeled D13 is the second electrode of T13, the one labeled S14 is the first electrode of T14, the one labeled D14 is the second electrode of T14.

In FIG. 5, the one labeled G1 is the gate electrode of T1, the one labeled G2 is the gate electrode of T2, the one labeled G3 is the gate electrode of T3, the one labeled G4 is the gate electrode of T4, and the one labeled G5 is the gate electrode of T5, the one labeled G6 is the gate electrode of T6, the one labeled G7 is the gate electrode of T7, the one labeled G8 is the gate electrode of T8, the one labeled G9 is the gate electrode of T9, and the one labeled G10 is the gate electrode of T10, the one labeled G11 is the gate electrode of T11, the one labeled G12 is the gate electrode of T12, the one labeled G13 is the gate electrode of T13, the one labeled G14 is the gate electrode of T14; the one labeled C1*a* is the first electrode plate of C1, the one labeled C2*a* is the first electrode plate of C2, and the one labeled C3*a* is the first electrode plate of C3.

In FIG. 6, the one labeled C1*b* is the second electrode plate of C1, the one labeled C2*b* is the second electrode plate of C2, and the one labeled C3*b* is the second electrode plate of C3.

Optionally, the first driving circuit is a driving circuit that generates an N-type gate driving signal, and the first driving signal is the N-type gate driving signal.

In at least one embodiment of the present disclosure, the driving module includes a second driving unit; the first driving unit includes a plurality of stages of second driving circuit, and the second driving circuit is configured to provide a second driving signal; the second driving unit includes a third first voltage line; the second driving circuit includes a second output sub-circuit; the second output sub-circuit includes a second driving transistor;

The orthographic projection of the third first voltage line on the base substrate is arranged on a side of the orthographic projection of the second driving transistor on the base substrate away from the display area;

The third first voltage line and the first first voltage line are arranged on different layers;

The orthographic projection of the third first voltage line on the base substrate at least partially overlaps the orthographic projection of the first first voltage line on the base substrate.

In at least one embodiment of the present disclosure, the first signal line may be a first first voltage line, and the second signal line may be a third first voltage line, but not limited thereto.

In specific implementation, the driving module can also include a second driving unit, which can be used to provide a second driving signal, and the second driving signal can be provided to the P-type transistor in the pixel circuit; the third first voltage line included in the second driving unit is arranged on a different layer from the first first voltage line, and the orthographic projection of the third first voltage line on the base substrate at least partially overlaps the orthographic projection of the first first voltage line on the base substrate, so as to reduce the width of the display substrate in the first direction and facilitate the realization of a narrow frame.

In at least one embodiment of the present disclosure, the orthographic projection of the third first voltage line on the base substrate coincide with the orthographic projection of the first first voltage line on the base substrate, so as to realize the narrow frame.

Optionally, the first first voltage line is arranged on the second metal layer, and the third first voltage line is arranged on the third metal layer; or, The first first voltage line is arranged on the third metal layer, and the third first voltage line is arranged on the second metal layer.

Figure 9:
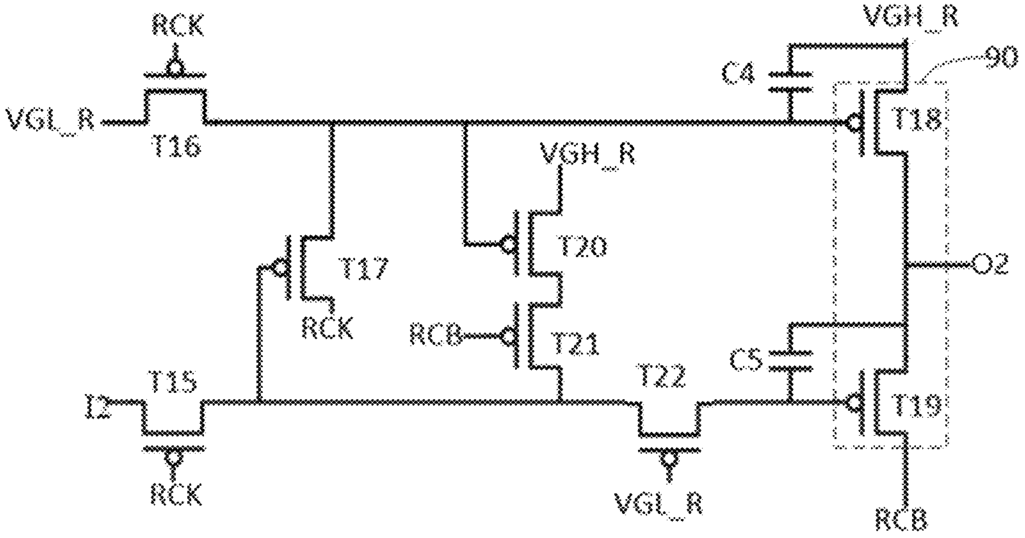
FIG. 9 is a circuit diagram of a second driving circuit in the display substrate of at least one embodiment of the present disclosure.

As shown in FIG. 9, the second driving circuit includes a second output sub-circuit 90; the second output sub-circuit 90 includes a second driving transistor T19 and a second driving reset transistor T18;

At least one embodiment of the second driving circuit further includes a fifteenth transistor T15, a sixteenth transistor T16, a seventeenth transistor T17, a twentieth transistor T20, a twenty-first transistor T21, and a twenty-second transistor T22, a fourth capacitor C4 and a fifth capacitor C5;

The gate electrode of T15 is electrically connected to the second first clock signal line RCK, the first electrode of T15 is electrically connected to the second input terminal I2, and the second electrode of T15 is electrically connected to the gate electrode of T17;

The first electrode of T17 is electrically connected to the second first clock signal line RCK, and the second electrode of T17 is electrically connected to the gate electrode of T18;

The gate electrode of T16 is electrically connected to the second first clock signal line RCK, the first electrode of T16 is electrically connected to the third first voltage line VGL_R, and the second electrode of T16 is electrically connected to the gate electrode of T20;

The gate electrode of T18 is electrically connected to the first electrode plate of C4, the first electrode of T18 is electrically connected to the second second voltage line VGH_R, and the second electrode of T18 is electrically connected to the second driving signal output terminal O2;

The gate electrode of T19 is electrically connected to the first electrode plate of C5, the first electrode of T19 is electrically connected to the second driving signal output terminal O2, and the second electrode of T19 is electrically connected to the second second clock signal line RCB;

The gate electrode of T20 is electrically connected to the gate electrode of T18, the first electrode of T20 is electrically connected to the second second voltage line VGH_R, and the second electrode of T20 is electrically connected to the first electrode of T21;

The gate electrode of T21 is electrically connected to the second second clock signal line RCB, and the second electrode of T21 is electrically connected to the gate electrode of T17;

The gate electrode of T22 is electrically connected to the third first voltage line VGL_R, the first electrode of T22 is electrically connected to the gate electrode of T17, and the second electrode of T22 is electrically connected to the gate electrode of T19;

The second electrode of C4 is electrically connected to the second second voltage line VGH_R;

The second electrode of C5 is electrically connected to the second driving signal output terminal O2.

In at least one embodiment of the second driving circuit shown in FIG. 9, each transistor is a P-type transistor, but not limited thereto.

Figure 10:
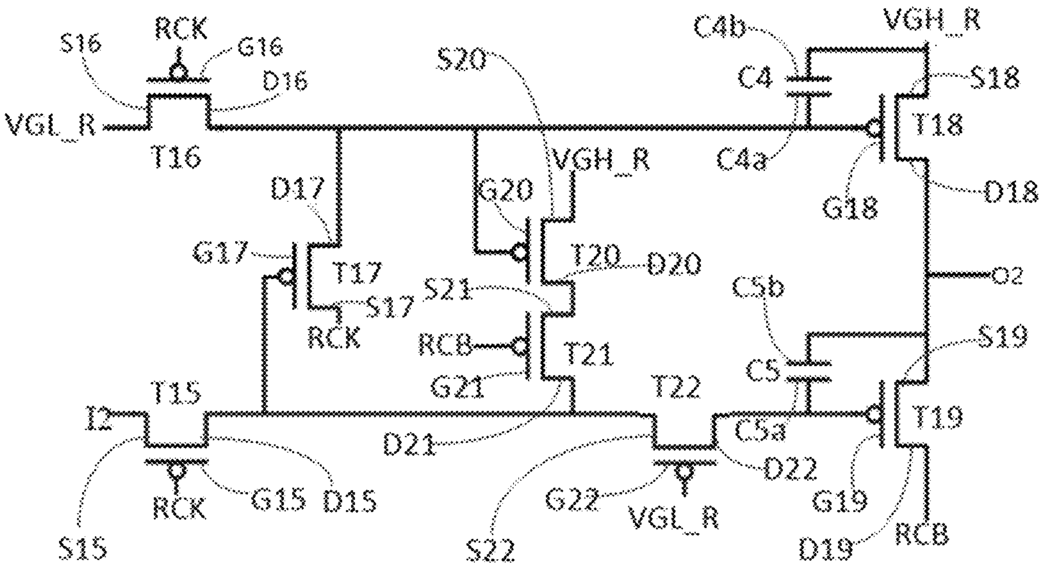
FIG. 10 is a circuit diagram of a second driving circuit in a display substrate according to at least one embodiment of the present disclosure.

FIG. 10 is a schematic diagram of labeling the electrodes of each transistor and the electrode plates of each capacitor on the basis of FIG. 9.

As shown in FIG. 10, the gate electrode G15 of T15 is electrically connected to the second second clock signal line RCB, the first electrode S15 of T15 is electrically connected to the second input terminal I2, the second electrode D15 of T15 is connected to the gate electrode G17 of T17;

The first electrode S17 of T17 is electrically connected to the second first clock signal line RCK, and the second electrode D17 of T17 is electrically connected to the gate electrode of T18;

The gate electrode G16 of T16 is electrically connected to the second first clock signal line RCK, the first electrode S16 of T16 is electrically connected to the third first voltage line VGL_R, and the second electrode D16 of T16 is electrically connected to the gate electrode of T20;

The gate electrode G18 of T18 is electrically connected to the first electrode plate C4*a* of C4, the first electrode S18 of T18 is electrically connected to the second second voltage line VGH_R, and the second electrode D18 of T18 is electrically connected to the second driving signal output terminal O2;

The gate electrode G19 of T19 is electrically connected to the first electrode plate C5*a* of C5, the first electrode S19 of T19 is electrically connected to the second driving signal output terminal O2, and the second electrode D19 of T19 is electrically connected to the second second clock signal line RCB;

The gate electrode G20 of T20 is electrically connected to the gate electrode G18 of T18, the first electrode S20 of T20 is electrically connected to the second second voltage line VGH_R, and the second electrode D20 of T20 is electrically connected to the first electrode S21 of T21;

The gate electrode G21 of T21 is electrically connected to the second second clock signal line RCB, and the second electrode D21 of T21 is electrically connected to the gate electrode G17 of T17;

The gate electrode G22 of T22 is electrically connected to the third first voltage line VGL_R, the first electrode S22 of T22 is electrically connected to the gate electrode G17 of T17, and the second electrode D22 of T22 is electrically connected to the gate electrode G19 of T19;

The second electrode plate C4*b* of C4 is electrically connected to the second second voltage line VGH_R;

The second electrode plate C5*b* of C5 is electrically connected to the second driving signal output terminal O2.

In at least one embodiment of the present disclosure, the second driving unit further includes a second start signal line, a second first clock signal line, a second second clock signal line, and a second second voltage line;

The third first voltage line, the second start signal line, the second first clock signal line, the second second clock signal line and the second second voltage line are arranged in sequence along the direction close to the display area.

Figure 11:
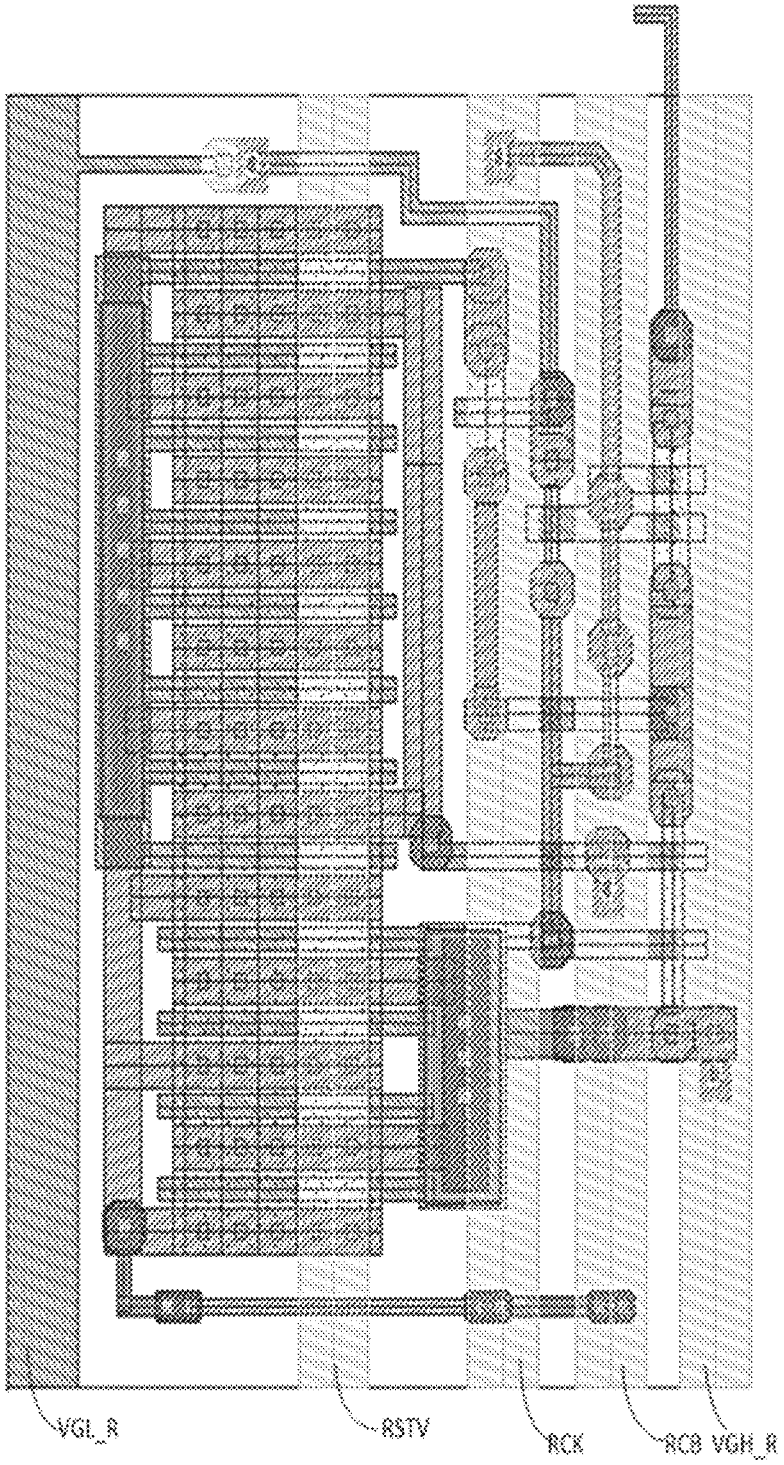
FIG. 11 is a layout diagram corresponding to the second driving circuit shown in FIG. 10.
Figure 12:
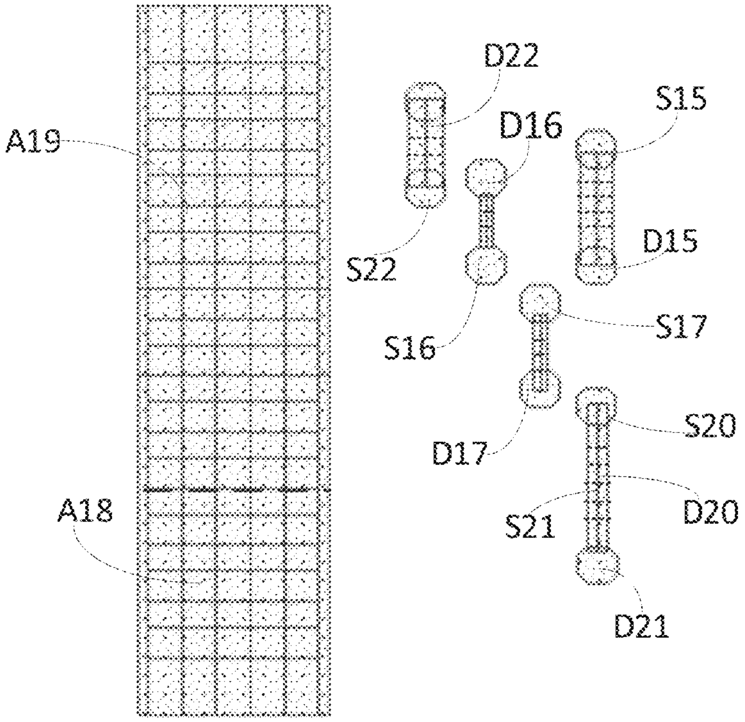
FIG. 12 is a layout diagram of the semiconductor layer in FIG. 11.
Figure 13:
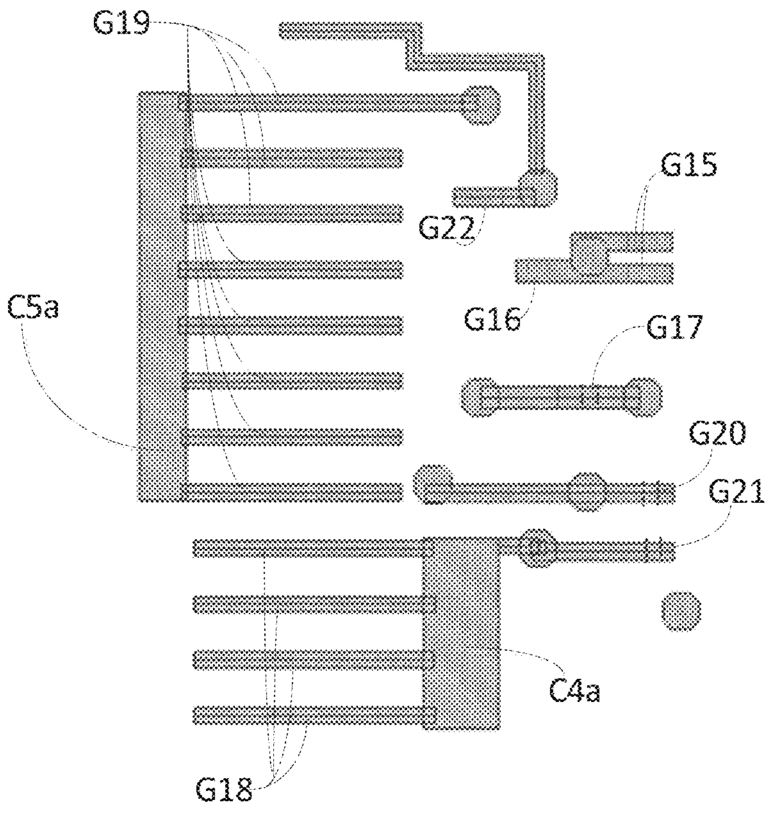
FIG. 13 is a layout diagram of the first gate metal layer in FIG. 11.
Figure 14:
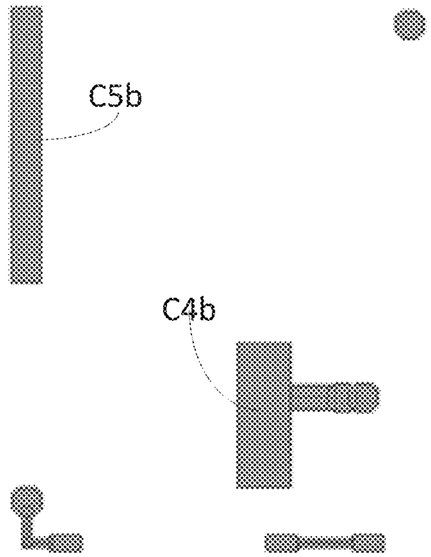
FIG. 14 is a layout diagram of the second gate metal layer in FIG. 11.
Figure 15:
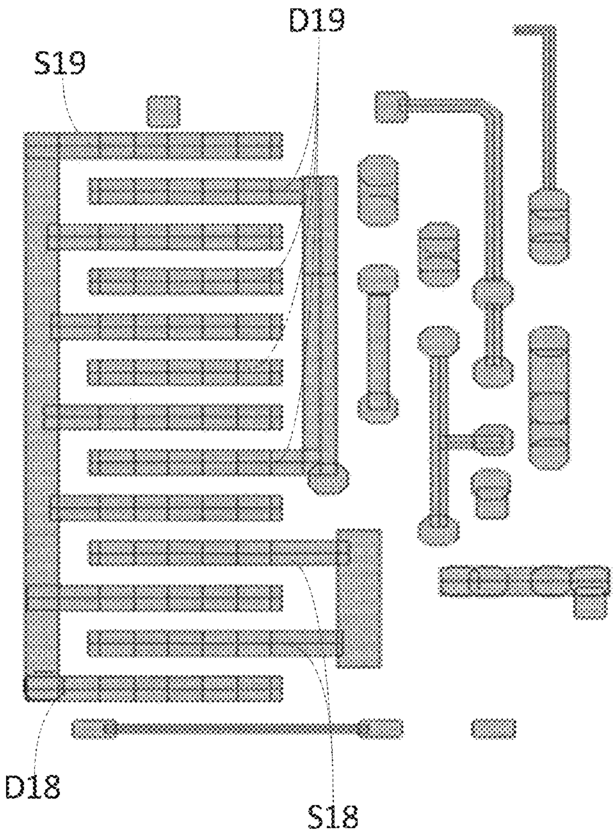
FIG. 15 is a layout diagram of the first metal layer in FIG. 11.
Figure 16:
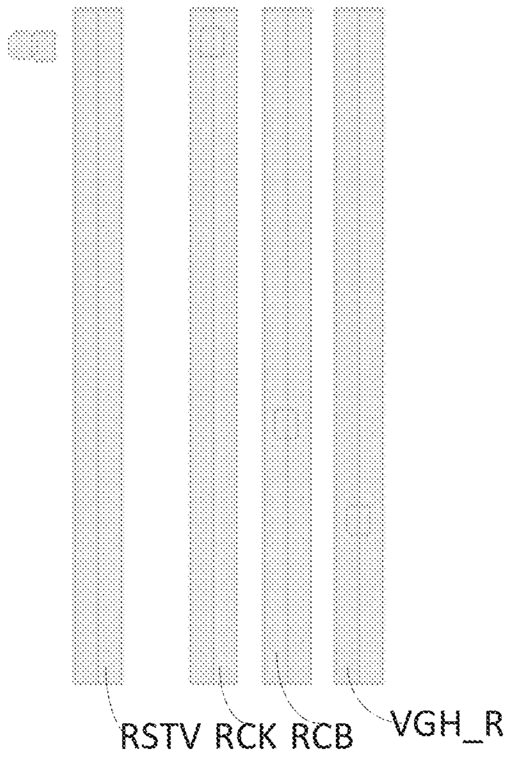
FIG. 16 is a layout diagram of the second metal layer in FIG. 11.
Figure 17:
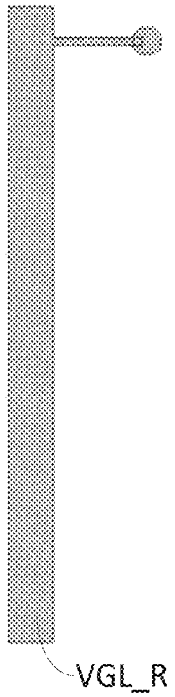
FIG. 17 is a layout diagram of the third metal layer in FIG. 11.

FIG. 11 is a layout diagram corresponding to the second driving circuit shown in FIG. 10. FIG. 12 is a layout diagram of the semiconductor layer in FIG. 11, FIG. 13 is a layout diagram of the first gate metal layer in FIG. 11, FIG. 14 is a layout diagram of the second gate metal layer in FIG. 11, FIG. 15 is a layout diagram of the first metal layer in FIG. 11, FIG. 16 is a layout diagram of the second metal layer in FIG. 11, and FIG. 17 is a layout diagram of the third metal layer in FIG. 11.

As shown in FIGS. 11-17, the gate electrode of each transistor and the first electrode plate of each capacitor are arranged on the first gate metal layer, the second electrode plate of each capacitor is arranged on the second gate metal layer, and the active layer of each transistor is arranged on the semiconductor layer.

As shown in FIG. 11-FIG. 17, the second start signal line RSTV, the second first clock signal line RCK, the second second clock signal line RCB and the second second voltage line VGH_R are all arranged on the second metal layer;

The third first voltage line VGL_R is arranged on the third metal layer.

In at least one embodiment of the present disclosure, when VGL_R is arranged on the third metal layer, VGL_N1 can be arranged on the second metal layer, and the orthographic projection of VGL_R on the base substrate at least partially overlaps the orthographic projection of VGL_N1 on the base substrate, to reduce the width of the display substrate in the horizontal direction, which is beneficial to realize narrow frame.

In specific implementation, VGL_R can also be arranged on the second metal layer, and at this time, VGL_N1 can be arranged on the third metal layer.

As shown in FIGS. 11-17, the orthographic projection of the third first voltage line VGL_R on the base substrate is set at a side of the orthographic projection of the gate electrode G19 of the second driving transistor T19 on the base substrate away from the display area, so that VGL_R and VGL_N1 overlap each other.

Optionally, the second output sub-circuit further includes a second driving reset transistor;

The orthographic projection of the second start signal line on the base substrate at least partially overlaps the orthographic projection of the first electrode of the second driving transistor on the base substrate, and the orthographic projection of the second start signal line on the base substrate at least partially overlaps the orthographic projection of the second electrode of the second driving transistor on the base substrate;

The orthographic projection of the second start signal line on the base substrate at least partially overlaps the orthographic projection of the first electrode of the second driving reset transistor on the base substrate, and the orthographic projection of the second start signal line on the base substrate at least partially overlaps the orthographic projection of the second electrode of the second driving reset transistor on the base substrate.

As shown in FIGS. 11-17, the orthographic projection of the second start signal line RSTV on the base substrate partially overlaps the orthographic projection of the first electrode S19 of the second driving transistor T19 on the base substrate, and the orthographic projection of the second start signal line RSTV on the base substrate partially overlaps the orthographic projection of the second electrode D19 of the second driving transistor T19 on the base substrate, and the orthographic projection of the second start signal line RSTV on the base substrate partially overlaps the orthographic projection of the first electrode S18 of the second driving reset transistor T18 on the base substrate, and the orthographic projection of the second start signal line RSTV on the base substrate partially overlaps the orthographic projection of the second electrode D18 of the second driving reset transistor T18 on the base substrate, to reduce the width of the display substrate along the first direction, which is beneficial to realize narrow frame.

Optionally, the second driving circuit further includes a fifteenth transistor, a twentieth transistor, and a twenty-first transistor;

The gate electrode of the fifteenth transistor is electrically connected to the second first clock signal line, and the second electrode of the fifteenth transistor is electrically connected to the second electrode of the twenty-first transistor; the first electrode of the twenty-first transistor is electrically connected to the second electrode of the twentieth transistor;

The gate electrode of the twentieth transistor is electrically connected to the gate electrode of the second driving reset transistor, and the gate electrode of the twenty-first transistor is electrically connected to the second second clock signal line;

The orthographic projection of the gate electrode of the fifteenth transistor on the base substrate, the orthographic projection of the gate electrode of the twentieth transistor on the base substrate, and the orthographic projection of the gate electrode of the twenty-first transistor on the base substrate are arranged between the orthographic projection of the second second clock signal line on the base substrate and the orthographic projection of the second second voltage line on the base substrate.

Optionally, the second driving circuit further includes a sixteenth transistor;

The gate electrode of the sixteenth transistor is electrically connected to the second electrode of the fifteenth transistor, the first electrode of the sixteenth transistor is electrically connected to the second first clock signal line, and the second electrode of the sixteenth transistor is electrically connected to the gate electrode of the driving reset transistor;

The orthographic projection of the gate electrode of the sixteenth transistor on the base substrate is arranged between the orthographic projection of the second first clock signal line on the base substrate and the orthographic projection of the second second clock signal line on the base substrate.

As shown in FIGS. 11-17, the orthographic projection of the gate electrode G15 of T15 on the base substrate, the orthographic projection of the gate electrode G20 of T20 on the base substrate, and the orthographic projection of the gate electrode G21 of T21 on the base substrate are arranged in sequence along the vertical direction;

The orthographic projection of G15 on the base substrate, the orthographic projection of G20 on the base substrate and the orthographic projection of G21 on the base substrate can all arranged between the orthographic projection of the second second clock signal line RCB on the base substrate and the orthographic projection of the second second voltage line VGH_R on the base substrate, to reduce the width of the display substrate in the horizontal direction, which is beneficial to realize a narrow frame.

As shown in FIGS. 11-17, the orthographic projection of the gate electrode G16 of T16 on the base substrate is arranged between the orthographic projection of the second first clock signal line RCK on the base substrate and the orthographic projections of the second second clock signal line RCB on the base substrate, to reduce the width of the display substrate in the horizontal direction, which facilitates the realization of a narrow frame.

As shown in FIGS. 11-17, the orthographic projection of the gate electrode G22 of T22 on the base substrate is set within the orthographic projection of the second first clock signal line RCK on the base substrate, and the orthographic projection of the gate electrode G17 of T17 on the base substrate is set within the orthographic projection of the second second clock signal line RCB on the base substrate;

The orthographic projection of the first electrode plate C4*a* of the fourth capacitor C4 on the base substrate partially overlaps the orthographic projection of the second first clock signal line RCK on the base substrate, and the orthographic projection of the second electrode plate C4*b* of the fourth capacitor C4 on the base substrate partially overlaps the orthographic projection of the second first clock signal line RCK on the base substrate.

In at least one embodiment of the present disclosure, the orthographic projection of the transistor included in the second driving circuit on the base substrate is set at a side of the orthographic projection of the third first voltage line on the base substrate close to the display area.

As shown in FIGS. 11-17, the orthographic projection of the gate electrode G15 of T15 on the base substrate, the orthographic projection of the gate electrode G16 of T16 on the base substrate, the orthographic projection of the gate electrode G17 of T17 on the base substrate, the orthographic projection of gate electrode G18 of T18 on the base substrate, the orthographic projection of gate electrode G19 of T19 on the base substrate, the orthographic projection of the gate electrode G20 of T20 on the base substrate, the orthographic projection of the gate electrode G21 of T21 on the base substrate and the orthographic projection of the gate electrode G22 of T22 on the base substrate are all arranged at a side of the orthographic projection of the third first voltage line VGL_R on the base substrate close to the display area.

Figure 18A:
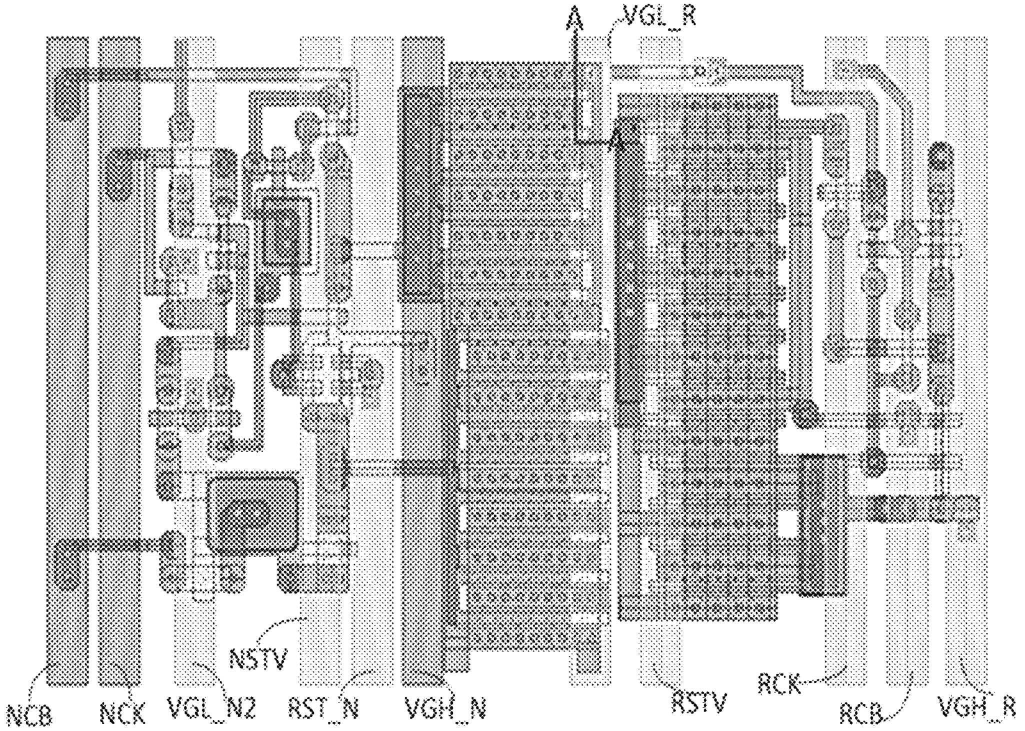
FIG. 18A is a layout diagram of a first driving circuit and a second driving circuit included in the display substrate according to at least one embodiment of the present disclosure.

As shown in FIG. 18A, the orthographic projection of the third first voltage line VGL_R on the base substrate overlaps the orthographic projection of VGL_N1 on the base substrate; VGL_N1 is arranged on the second metal layer, and VGL_R is arranged on the third metal layer.

Figure 18B:
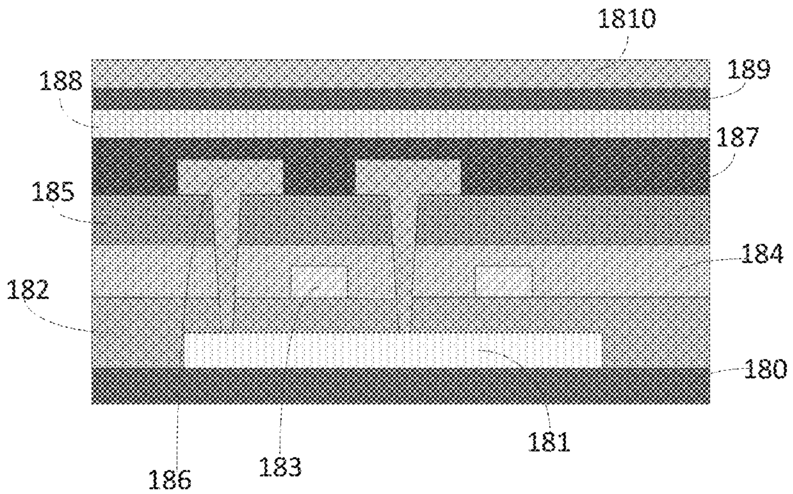
FIG. 18B is A-A' sectional view in FIG. 18A.

FIG. 18B is a cross-sectional view of A-A' in FIG. 18A.

In FIG. 18B, the reference number 180 is the base substrate, the reference number 181 is the semiconductor layer, the reference number 182 is the first insulating layer, the reference number 183 is the first gate metal layer, and the reference number 184 is the second insulating layer, the reference number 185 is the third insulating layer, the reference number 186 is the first metal layer, the reference number 187 is the fourth insulation layer, the reference number 188 is the second metal layer, and the reference number 189 is the fifth insulating layer, the reference number 810 is the third metal layer.

Figure 18C:
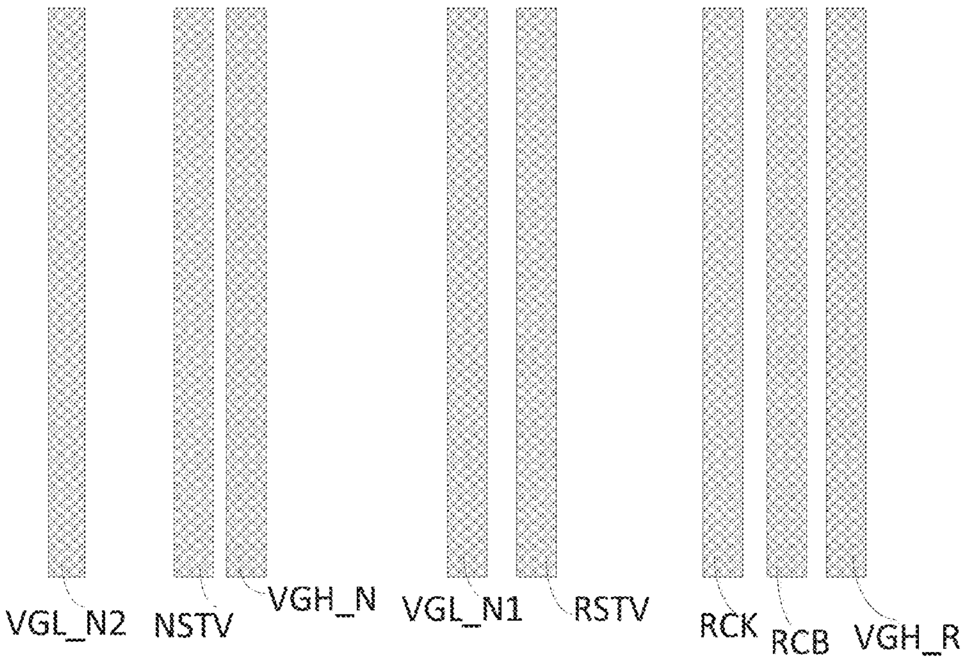
FIG. 18C is a layout diagram of the second source-drain metal layer in FIG. 18A.
Figure 18D:
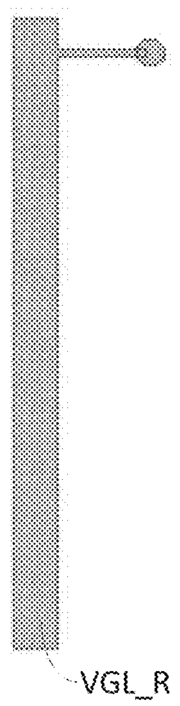
FIG. 18D is a layout diagram of the third source-drain metal layer in FIG. 18A.

FIG. 18C is a layout diagram of the second metal layer in FIG. 18A, and FIG. 18D is a layout diagram of the third metal layer in 18A.

In at least one embodiment of the present disclosure, T9, T10, VGL_R overlap VGL_N1, so VGL_N1 has a shielding effect, which can reduce the parasitic capacitance between T9 and VGL_N1, and reduce the parasitic capacitance between T10 and VGL_N1. VGL_N1 and VGL_R are DC voltage lines, and the overlapping arrangement has little influence thereon.

As shown in FIG. 12, the one labeled A18 is the active layer of T18, and the one labeled A19 is the active layer of T19;

The one labeled S15 is the first electrode of T15, the one labeled D15 is the second electrode of T15; the one labeled S16 is the first electrode of T16, and the one labeled D16 is the second electrode of T16; the one labeled S17 is the first electrode of T17, the one labeled D17 is the second electrode of T17; the one labeled S20 is the first electrode of T20, the one labeled D20 is the second electrode of T20; the one labeled S21 is the first electrode of T21, the one labeled D21 is the second electrode of T21; the one labeled S22 is the first electrode of T22, and the one labeled D22 is the second electrode of T22.

As shown in FIG. 13, the one labeled G15 is the gate electrode of T15, the one labeled G16 is the gate electrode of T16, the one labeled G17 is the gate electrode of T17, the one labeled G18 is the gate electrode of T18, and the one labeled G19 is the gate electrode of T19, the one labeled G20 is the gate electrode of T20, the one labeled G21 is the gate electrode of T21, and the gate labeled G22 is the gate electrode of T22;

The one labeled C4*a* is the first electrode plate of C4, and the one labeled C5*a* is the first electrode plate of C5.

As shown in FIG. 14, the one labeled C4*b* is the second electrode plate of C4, and the one labeled C5*b* is the second electrode plate of C5.

As shown in FIG. 15, the one labeled S18 is the first electrode of T18, the one labeled D18 is the second electrode of T18; the one labeled S19 is the first electrode of T19, and the one labeled D19 is the second electrode of T19.

Optionally, the base substrate includes a peripheral area and a display area; the driving units included in the driving module are all arranged in the peripheral area of the base substrate;

The first driving unit is arranged on a side of the second driving unit away from the display area.

Figure 19:
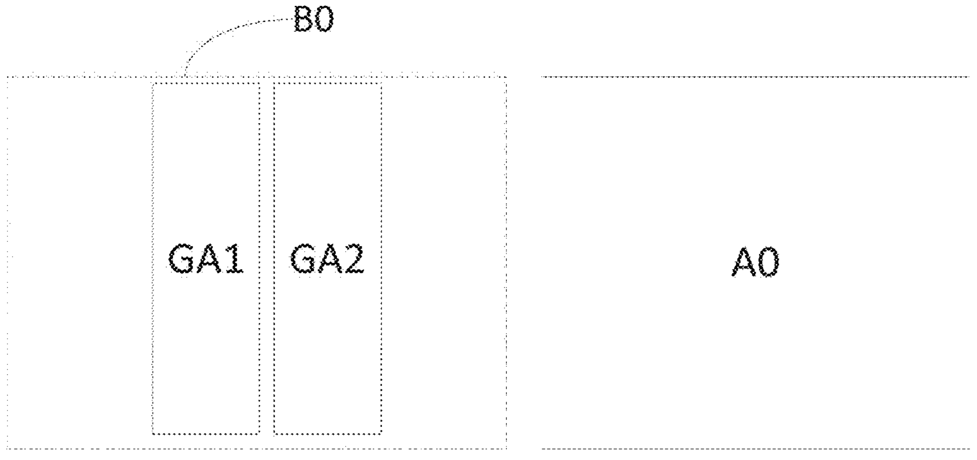
FIG. 19 is a structural diagram of a display substrate according to at least one embodiment of the present disclosure.

As shown in FIG. 19, the base substrate includes a peripheral area B0 and a display area A0;

Both the first driving unit GA1 and the second driving unit GA2 are arranged in the peripheral area B0;

The first driving unit GA1 is arranged on a side of the second driving unit GA2 away from the display area A0.

Figure 20:
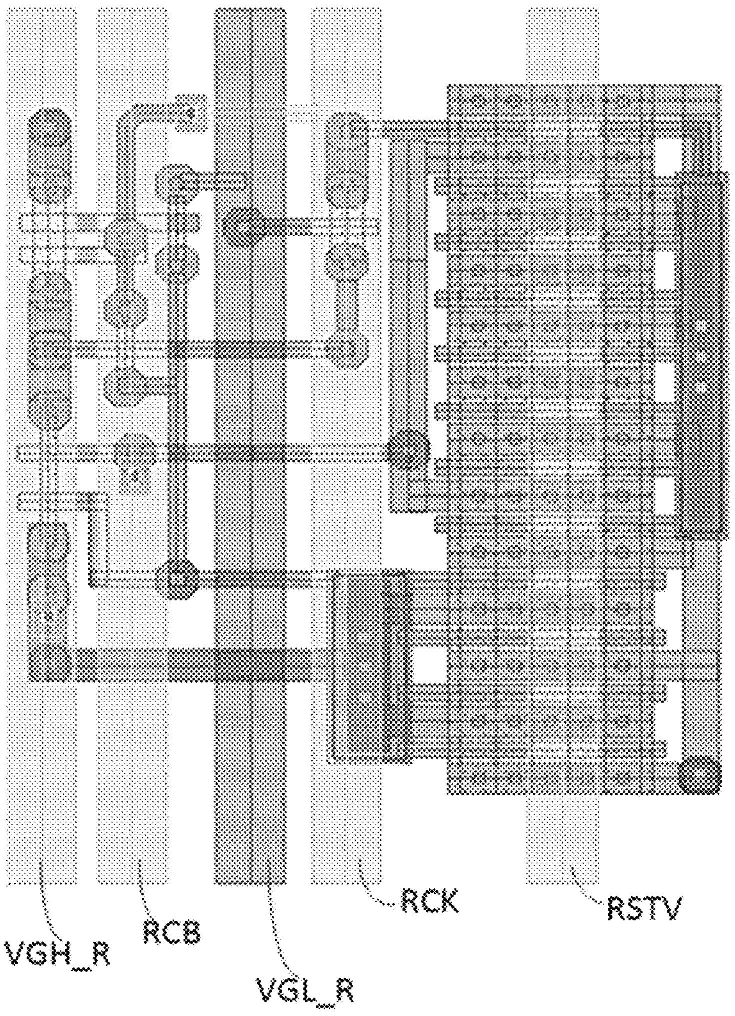
FIG. 20 is another layout diagram corresponding to the second driving circuit shown in FIG. 10.

FIG. 20 is another layout diagram corresponding to the second driving circuit shown in FIG. 10.

Figure 21:
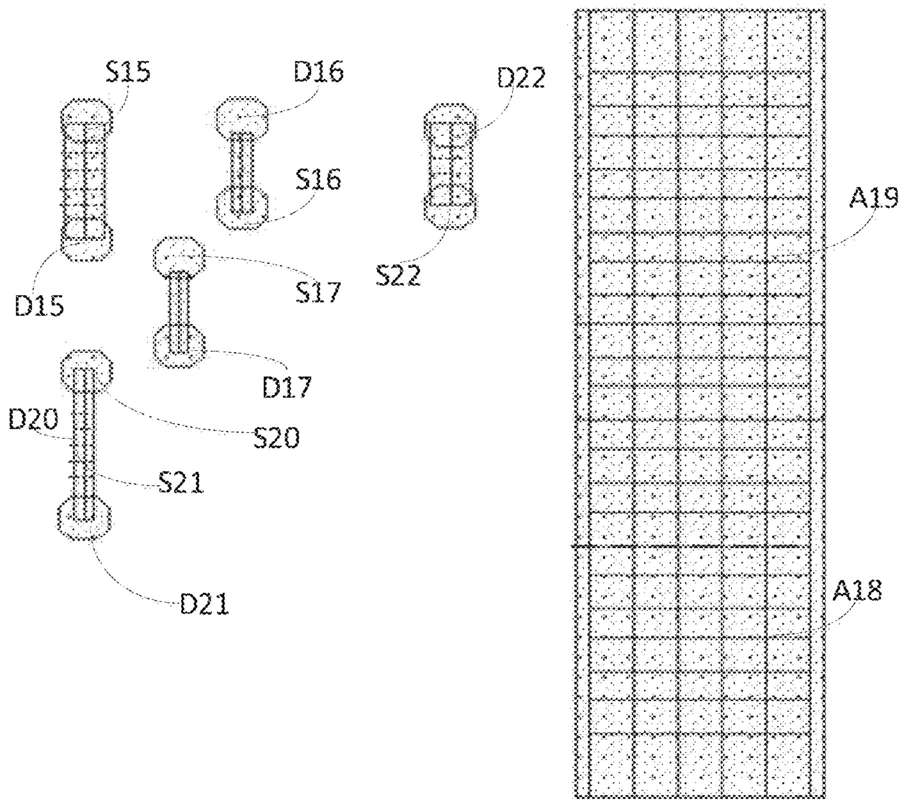
FIG. 21 is a layout diagram of the semiconductor layer in FIG. 20.
Figure 22:
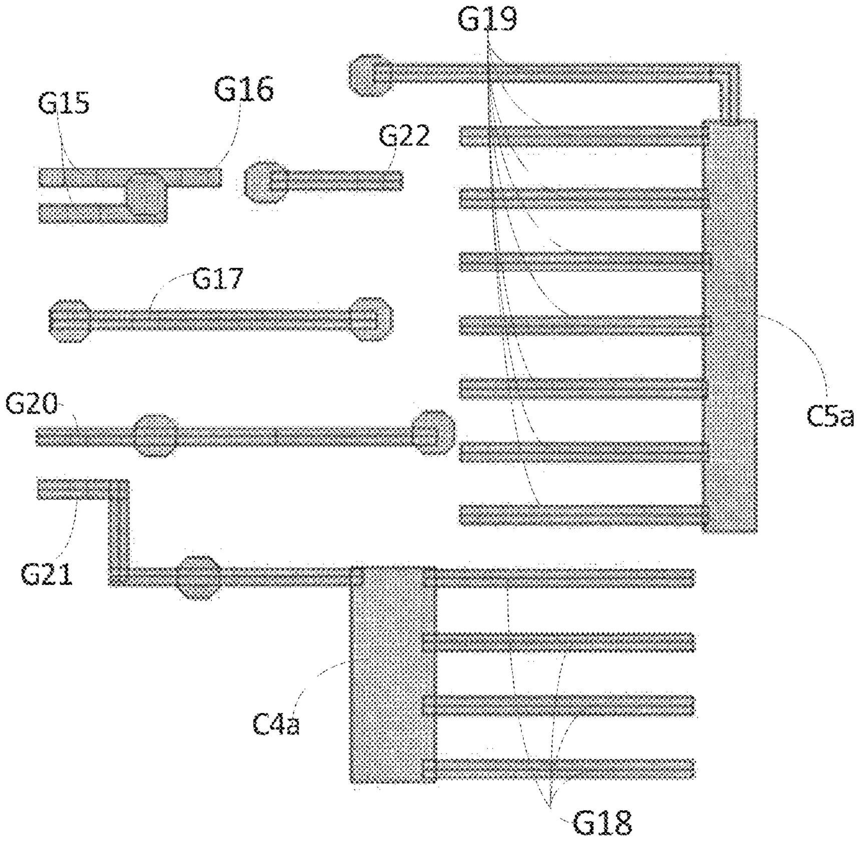
FIG. 22 is a layout diagram of the first gate metal layer in FIG. 20.
Figure 23:
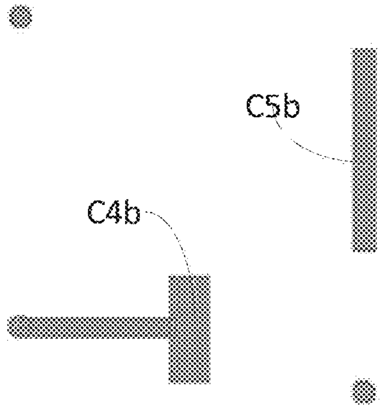
FIG. 23 is a layout diagram of the second gate metal layer in FIG. 20.
Figure 24:
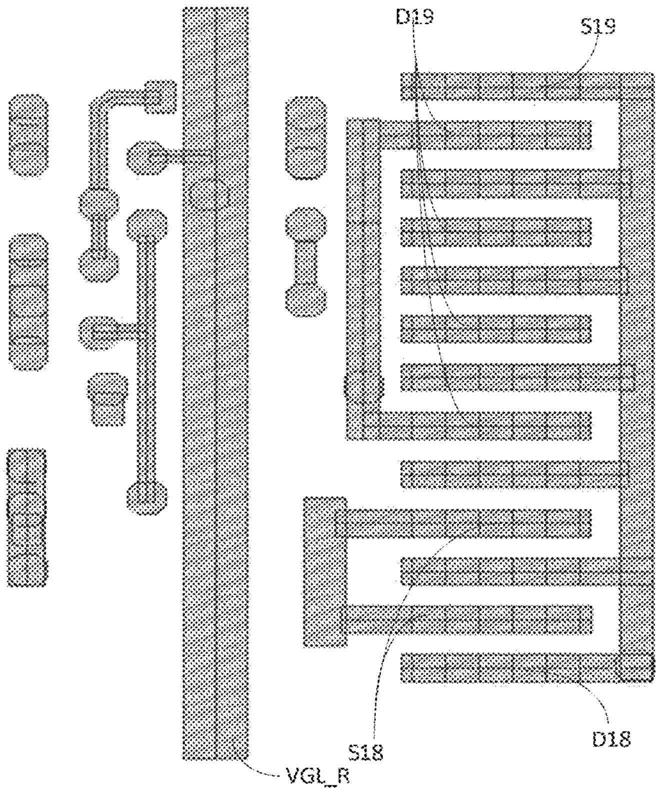
FIG. 24 is a layout diagram of the first metal layer in FIG. 22.
Figure 25:
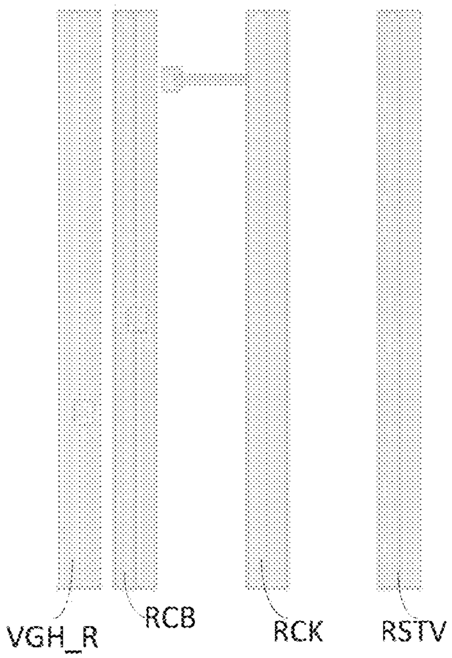
FIG. 25 is a layout diagram of the second metal layer in FIG. 22.

FIG. 21 is a layout diagram of the semiconductor layer in FIG. 20, FIG. 22 is a layout diagram of the first gate metal layer in FIG. 20, FIG. 23 is a layout diagram of the second gate metal layer in FIG. 20, FIG. 24 is a layout diagram of the first metal layer in FIG. 22, FIG. 25 is the layout diagram of the second metal layer in FIG. 22.

In FIG. 21, the one labeled A18 is the active layer of T18, and the one labeled A19 is the active layer of T19;

The one labeled S15 is the first electrode of T15, the one labeled D15 is the second electrode of T15; the one labeled S16 is the first electrode of T16, and the one labeled D16 is the second electrode of T16; the one labeled S17 is the first electrode of T17, the one labeled D17 is the second electrode of T17; the one labeled S20 is the first electrode of T20, the one labeled D20 is the second electrode of T20; the one labeled S21 is the first electrode of T21, the one labeled D21 is the second electrode of T21; the one labeled S22 is the first electrode of T22, and the one labeled D22 is the second electrode of T22.

As shown in FIG. 22, the one labeled G15 is the gate electrode of T15, the one labeled G16 is the gate electrode of T16, the one labeled G17 is the gate electrode of T17, the one labeled G18 is the gate electrode of T18, and the one labeled G19 is the gate electrode of T19, the one labeled G20 is the gate electrode of T20, the one labeled G21 is the gate electrode of T21, and the one labeled G22 is the gate electrode of T22;

The one labeled C4*a* is the first electrode plate of C4, and the one labeled C5*a* is the first electrode plate of C5.

As shown in FIG. 23, the one labeled C4*b* is the second electrode plate of C4, and the one labeled C5*b* is the second electrode plate of C5.

As shown in FIG. 24, the one labeled S18 is the first electrode of T18, the one labeled D18 is the second electrode of T18; the one labeled S19 is the first electrode of T19, and the one labeled D19 is the second electrode of T19, the one labeled VGL_R is the third first voltage line VGL_R.

In FIG. 25, the one labeled VGH_R is the second second voltage line, the one labeled RCB is the second second clock signal line, the one labeled RCK is the second first clock signal line, and the one labeled RSTV is the second starting signal line.

As shown in FIG. 20-FIG. 25, VGH_R, RCB, VGL_R, RCK and RSTV are arranged in sequence along the direction close to the display area.

Figure 26:
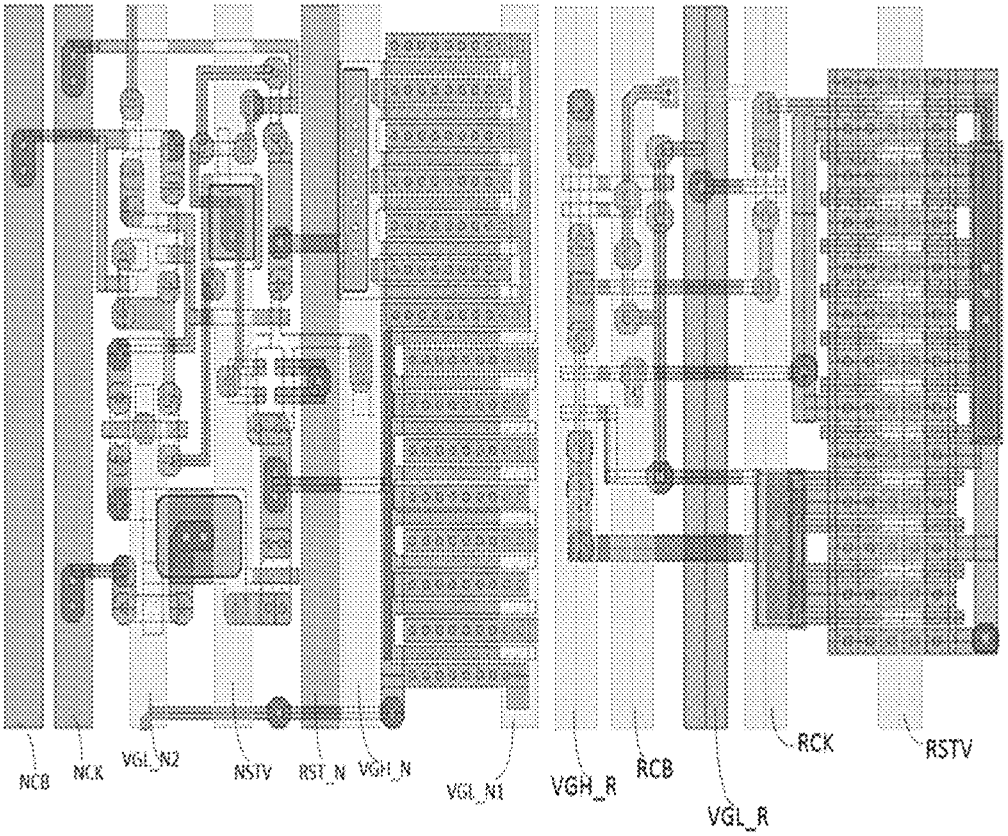
FIG. 26 is a schematic diagram of the arrangement relationship between the first driving circuit shown in FIG. 3 and the second driving circuit shown in FIG. 20.

FIG. 26 is a schematic diagram of arrangement relationship between the first driving circuit shown in FIG. 3 and the second driving circuit shown in FIG. 20.

In at least one embodiment of the present disclosure, the driving module includes a third driving unit, the third driving unit includes a plurality of stages of third driving circuit, and the third driving circuit is configured to provide a third driving signal;

The third driving unit is arranged on a side of the first driving unit away from the second driving unit.

In a specific implementation, the driving module may further include a third driving unit, the third driving circuit included in the third driving unit is configured to provide a third driving signal, and the third driving unit may be arranged at a side of the first driving unit far away from the second driving unit.

Optionally, the third driving signal may be a light emitting control signal, but not limited thereto.

Figure 27A:
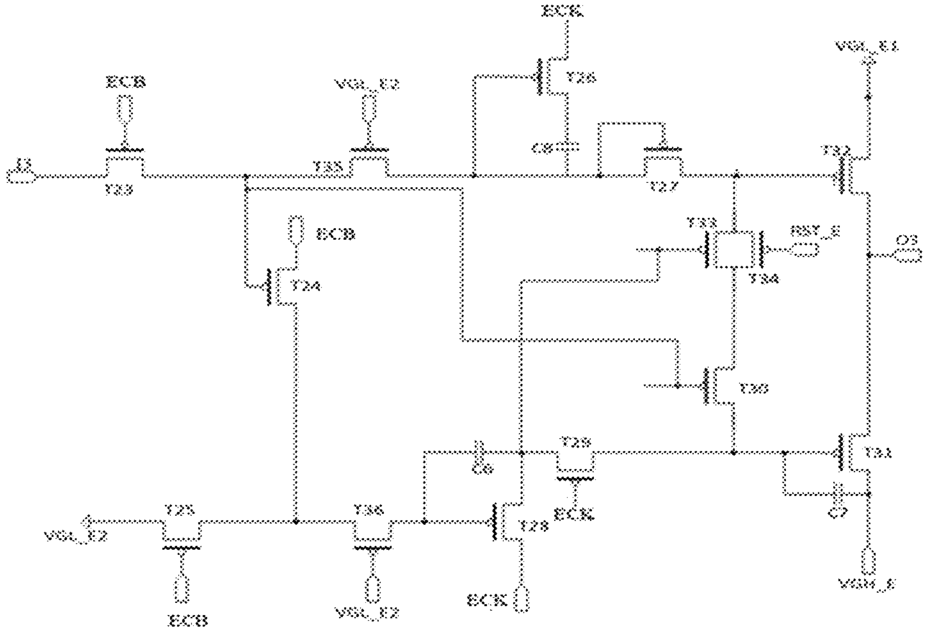
FIG. 27A is a circuit diagram of a third driving circuit in the display substrate of at least one embodiment of the present disclosure.

As shown in FIG. 27A, the third driving circuit includes a third output sub-circuit;

The third output sub-circuit includes a third driving transistor T31 and a third driving reset transistor T32;

The third driving circuit further includes a twenty-third transistor T23, a twenty-fourth transistor T24, a twenty-fifth transistor T25, a twenty-sixth transistor T26, a twenty-seventh transistor T27, a twenty-eighth transistor T28, a twenty-ninth transistor T29, a thirtieth transistor T30, a thirty-third transistor T33, a thirty-fourth transistor T34, a third on-off control transistor T35, a fourth on-off control transistor T36, a sixth capacitor C6, a seventh capacitor C7 and an eighth capacitor C8;

The gate electrode of T23 is electrically connected to the third second clock signal line ECB, the first electrode of T23 is electrically connected to the third input terminal I3, and the second electrode of T23 is electrically connected to the gate electrode G24 of T24;

The first electrode of T24 is electrically connected to the third second clock signal line ECB, and the second electrode of T24 is electrically connected to the second electrode D25 of T25;

The gate electrode of T25 is electrically connected to the third second clock signal line ECB, and the first electrode of T25 is electrically connected to the fifth first voltage line VGL_E2;

The gate electrode of T26 is electrically connected to the gate electrode of T27, the first electrode of T26 is electrically connected to the third first clock signal line ECK, the second electrode of T26 is electrically connected to the first electrode plate C8*a* of C8; the second electrode plate of C8 is electrically connected to the gate electrode of T27;

The gate electrode of T27 is electrically connected to the first electrode of T27, and the second electrode of T27 is electrically connected to the gate electrode of T32;

The gate electrode of T28 is electrically connected to the first electrode plate of C6, the first electrode of T28 is electrically connected to the third first clock signal line ECK, and the second electrode of T28 is electrically connected to the second electrode plate of C6;

The gate electrode of T29 is electrically connected to the third first clock signal line ECK, the first electrode of T29 is electrically connected to the second electrode plate of C6, and the second electrode of T29 is electrically connected to the gate electrode of T31;

The gate electrode of T30 is electrically connected to the gate electrode of T24, the first electrode of T30 is electrically connected to the third second voltage line VGH_E, and the second electrode of T30 is electrically connected to the gate electrode G31 of T31;

The first electrode of T31 is electrically connected to the third second voltage line VGH_E, and the second electrode of T31 is electrically connected to the third driving signal output terminal O3;

The first electrode of T32 is electrically connected to the third driving signal output terminal O3, and the second electrode of T32 is electrically connected to the fourth first voltage line VGL_E1;

The gate electrode of T33 is electrically connected to the second electrode of T28, the first electrode of T33 is electrically connected to the third second voltage line VGH_E, and the second electrode of T33 is electrically connected to the gate electrode of T32;

The gate electrode of T34 is electrically connected to the third reset line RST_, the first electrode of T34 is electrically connected to the third second voltage line VGH_E, and the second electrode of T34 is electrically connected to the gate electrode of T32;

The gate electrode of T35 is electrically connected to the fifth first voltage line VGL_E2, the first electrode of T35 is electrically connected to the gate electrode of T24, and the second electrode of T35 is electrically connected to the gate electrode of T26;

The gate electrode of T36 is electrically connected to the fifth first voltage line VGL_E2, the first electrode of T36 is electrically connected to the second electrode of T24, and the second electrode of T36 is electrically connected to the gate electrode of T28;

The first electrode plate of C7 is electrically connected to the gate electrode of T31, and the second electrode plate of C7 is electrically connected to the third second voltage line VGH_E.

Figure 27B:
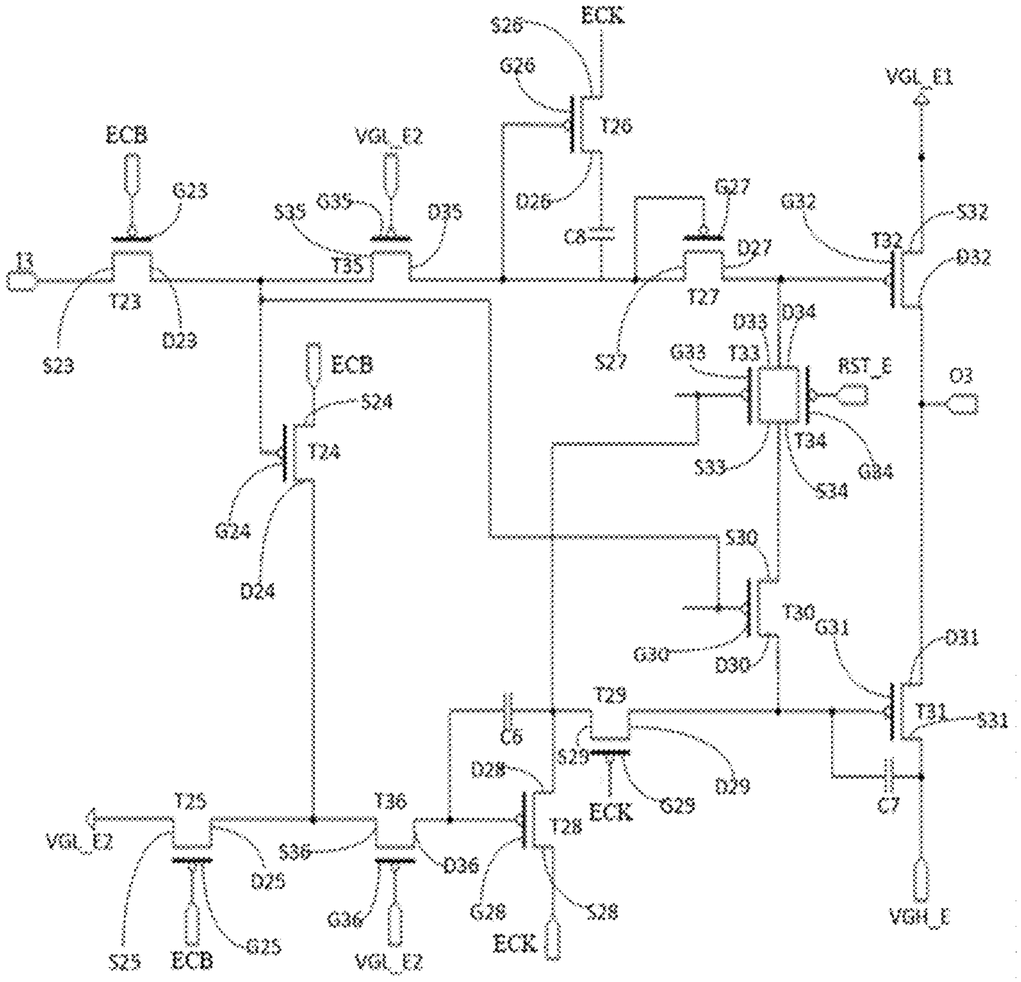
FIG. 27B is a circuit diagram of a third driving circuit in the display substrate of at least one embodiment of the present disclosure.

As shown in FIG. 27B, the third driving circuit includes a third output sub-circuit;

The third output sub-circuit includes a third driving transistor T31 and a third driving reset transistor T32;

The third driving circuit further includes a twenty-third transistor T23, a twenty-fourth transistor T24, a twenty-fifth transistor T25, a twenty-sixth transistor T26, a twenty-seventh transistor T27, a twenty-eighth transistor T28, a twenty-ninth transistor T29, a thirtieth transistor T30, a thirty-third transistor T33, a thirty-fourth transistor T34, a third on-off control transistor T35, a fourth on-off control transistor T36, a sixth capacitor C6, a seventh capacitor C7 and an eighth capacitor C8;

The gate electrode G23 of T23 is electrically connected to the third second clock signal line ECB, the first electrode S23 of T23 is electrically connected to the third input terminal I3, and the second electrode D23 of T23 is electrically connected to the gate electrode G24 of T24;

The first electrode S24 of T24 is electrically connected to the third second clock signal lines ECB, and the second electrode D24 of T24 is electrically connected to the second electrode D25 of T25;

The gate electrode G25 of T25 is electrically connected to the third second clock signal line ECB, and the first electrode S25 of T25 is electrically connected to the fifth first voltage line VGL_E2;

The gate electrode G26 of T26 is electrically connected to the gate electrode G27 of T27, the first electrode S26 of T26 is electrically connected to the third first clock signal line ECK, and the second electrode D26 of T26 is electrically connected to the first electrode plate C8*a* of C8; the second electrode plate C8*b* of C8 is electrically connected to the gate electrode G27 of T27;

The gate electrode G27 of T27 is electrically connected to the first electrode S27 of T27, and the second electrode D27 of T27 is electrically connected to the gate electrode G32 of T32;

The gate electrode G28 of T28 is electrically connected to the first electrode plate C6*a* of C6, the first electrode S28 of T28 is electrically connected to the third first clock signal line ECK, the second electrode D28 of T28 is electrically connected to the second electrode plate C6*b* of C6;

The gate electrode G29 of T29 is electrically connected to the third first clock signal line ECK, the first electrode S29 of T29 is electrically connected to the second electrode plate C6*b* of C6, and the second electrode D29 of T29 is electrically connected to the gate electrode G31 of T31;

The gate electrode G30 of T30 is electrically connected to the gate electrode G24 of T24, the first electrode S30 of T30 is electrically connected to the third second voltage line VGH_E, and the second electrode D30 of T30 is electrically connected to the gate electrode G31 of T31;

The first electrode S31 of T31 is electrically connected to the third second voltage line VGH_E, and the second electrode D31 of T31 is electrically connected to the third driving signal output terminal O3;

The first electrode S32 of T32 is electrically connected to the third driving signal output terminal O3, and the second electrode D32 of T32 is electrically connected to the fourth first voltage line VGL_E1;

The gate electrode G33 of T33 is electrically connected to the second electrode D28 of T28, the first electrode S33 of T33 is electrically connected to the third second voltage line VGH_E, and the second electrode D33 of T33 is electrically connected to the gate electrode G32 of T32;

The gate electrode G34 of T34 is electrically connected to the third reset line RST_E, the first electrode S34 of T34 is electrically connected to the third second voltage line VGH_E, and the second electrode D34 of T34 is electrically connected to the gate electrode G32 of T32;

The gate electrode G35 of T35 is electrically connected to the fifth first voltage line VGL_E2, the first electrode S35 of T35 is electrically connected to the gate electrode G24 of T24, and the second electrode D35 of T35 is electrically connected to the gate electrode G26 of T26;

The gate electrode G36 of T36 is electrically connected to the fifth first voltage line VGL_E2, the first electrode S36 of T36 is electrically connected to the second electrode D24 of T24, and the second electrode D36 of T36 is electrically connected to the gate electrode G28 of T28;

The first electrode plate C7*a* of C7 is electrically connected to the gate electrode G31 of T31, and the second electrode plate C7*b* of C7 is electrically connected to the third second voltage line VGH_E.

In at least one embodiment of the third driving circuit shown in FIG. 27A and FIG. 27B, all transistors are P-type transistors, but not limited thereto.

Figure 28:
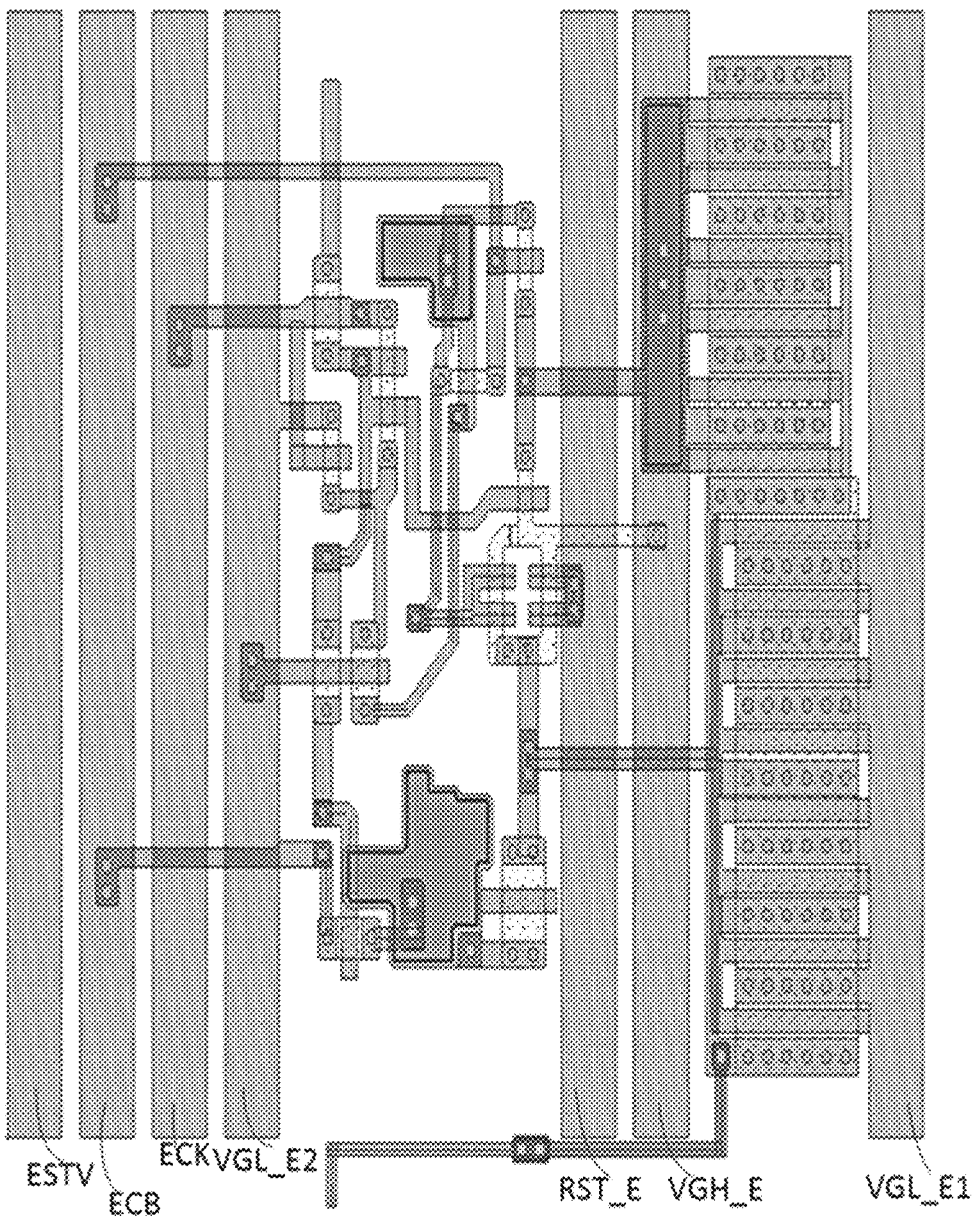
FIG. 28 is a layout diagram corresponding to the third driving circuit shown in FIG. 27B.
Figure 29:
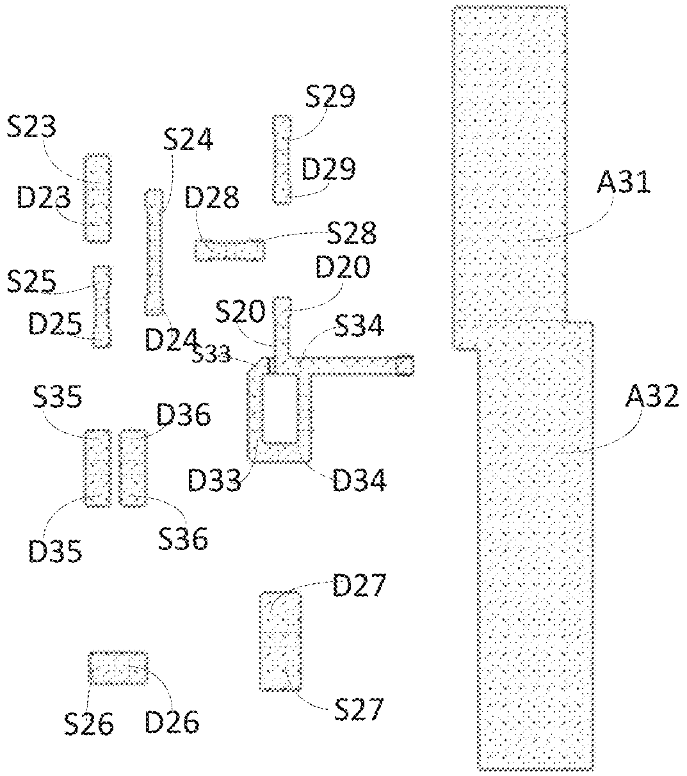
FIG. 29 is a layout diagram of the semiconductor layer in FIG. 28.
Figure 30:
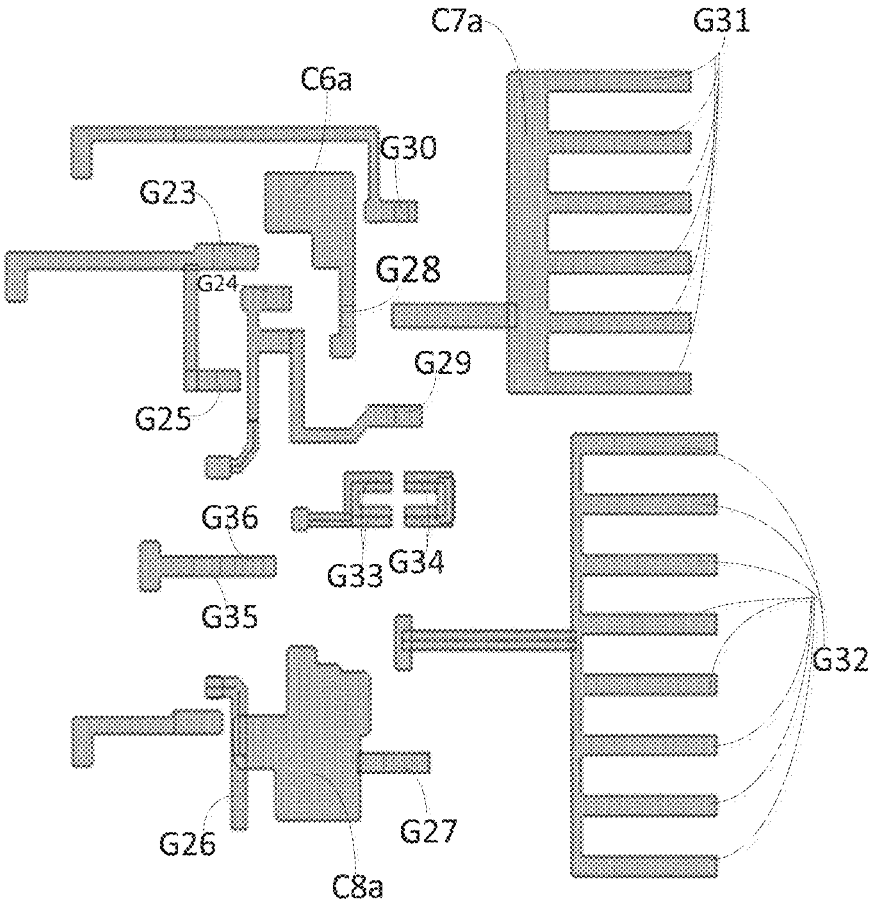
FIG. 30 is a layout diagram of the first gate metal layer in FIG. 28.
Figure 31:
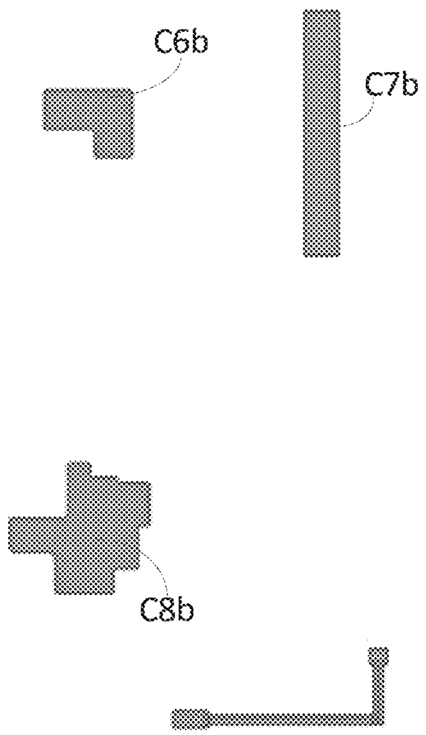
FIG. 31 is a layout diagram of the second gate metal layer in FIG. 28.
Figure 32:
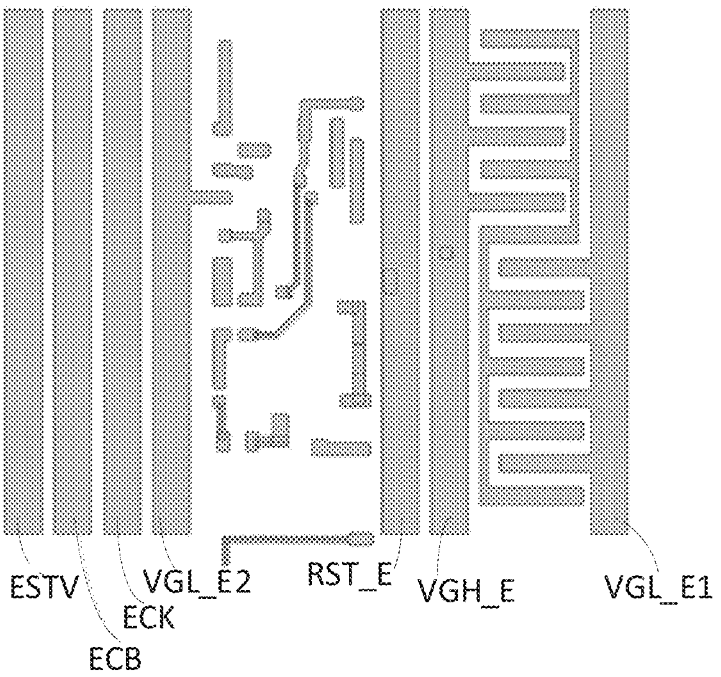
FIG. 32 is a layout diagram of the first metal layer in FIG. 28.

FIG. 28 is a layout diagram corresponding to the third driving circuit shown in FIG. 27B, FIG. 29 is a layout diagram of the semiconductor layer in FIG. 28, and FIG. 30 is a layout diagram of the first gate metal layer in FIG. 28, FIG. 31 is a layout diagram of the second gate metal layer in FIG. 28, and FIG. 32 is a layout diagram of the first metal layer in FIG. 28.

As shown in FIGS. 28-32, the first electrode plate of each capacitor and the gate electrode of each transistor are arranged on the first gate metal layer, the second electrode plate of each capacitor is arranged on the second gate metal layer, and the active layer of each transistor is arranged on the semiconductor layer.

In FIG. 28 and FIG. 32, the one labeled ESTV is the third start signal line, the one labeled ECK is the third first clock signal line, and the one labeled ECB is the third second clock signal line, the one labeled RST_E is the third reset line, the one labeled VGH_E is the third second voltage line, the one labeled VGL_E1 is the fourth first voltage line, and the one labeled VGL_E2 is the fifth first voltage line.

As shown in FIG. 32, ESTV, ECK, ECB, RST_E, VGH_E, VGL_E1 and VGL_E2 are all arranged on the first metal layer.

In at least one embodiment of the third driving circuit corresponding to FIGS. 28-32, T33 and T34 are double-gate transistors, but not limited thereto.

In FIG. 29, the one labeled A31 is the active layer of T31, the one labeled A32 is the active layer of T32, the one labeled S23 is the first electrode of T23, and the one labeled D23 is the second electrode of T23; the one labeled S24 is the first electrode of T24, the one labeled D24 is the second electrode of T24; the one labeled S25 is the first electrode of T25, the one labeled D25 is the second electrode of T25; the one labeled S26 is the first electrode of T26, the one labeled D26 is the second electrode of T26; the one labeled S27 is the first electrode of T27, and the one labeled D27 is the second electrode of T27; the one labeled S28 is the first electrode of T28, the one labeled D28 is the second electrode of T28; the one labeled S29 is the first electrode of T29, the one labeled D29 is the second electrode of T29; the one labeled S30 is the first electrode of T30, and the one labeled D30 is the second electrode of T30; the one labeled S33 is the first electrode of T33, the one labeled D33 is the second electrode of T33; the one labeled S34 is the first electrode of T34, the one labeled D34 is the second electrode of T34; the one labeled S35 is the first electrode of T35, the one labeled D35 is the second electrode of T35; the one labeled S36 is the first electrode of T36, and the one labeled D36 is the second electrode of T36.

In FIG. 30, the one labeled G23 is the gate electrode of T23, the one labeled G24 is the gate electrode of T24, the one labeled G25 is the gate electrode of T25, the one labeled G26 is the gate electrode of T26, and the one labeled G27 is the gate electrode of T27, the one labeled G28 is the gate electrode of T28, the one labeled G29 is the gate electrode of T29, the one labeled G30 is the gate electrode of T30, the one labeled G31 is the gate electrode of T31, and the one labeled G32 is the gate electrode of T32, the one labeled G33 is the gate electrode of T33, the one labeled G34 is the gate electrode of T34, the one labeled G35 is the gate electrode of T35, the one labeled G36 is the gate electrode of T36, and the one labeled C6*a* is the first electrode plate of C6, the one labeled C7*a* is the first electrode plate of C7, and the one labeled C8*a* is the first electrode plate of C8.

In FIG. 31, the one labeled C6*b* is the second electrode plate of C6, the one labeled C7*b* is the second electrode plate of C7, and the one labeled C8*b* is the second electrode plate of C8.

In at least one embodiment of the present disclosure, the driving module includes a fourth driving unit, the driving unit includes a plurality of stages of fourth driving circuit, the fourth driving circuit is used to provide a fourth driving signal, and the fourth driving signal is a P-type gate driving signal;

The fourth driving unit is arranged on a side of the second driving unit close to the display area.

In a specific implementation, the P-type gate driving signal may be provided to a P-type transistor included in the pixel circuit and have a high-level as the valid level, but it is not limited thereto.

Figure 33A:
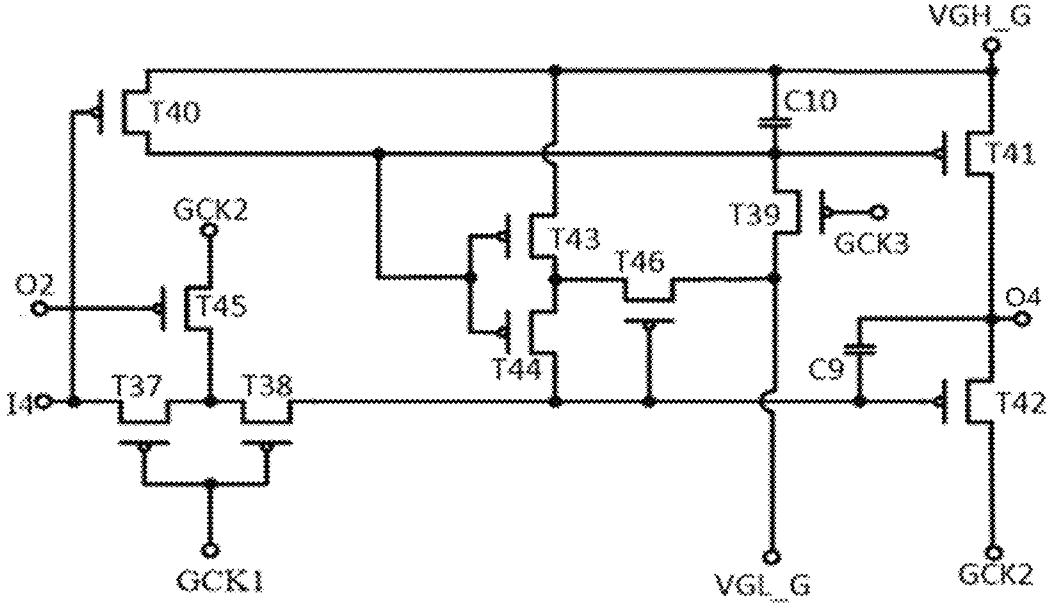
FIG. 33A is a circuit diagram of a fourth driving circuit in a display substrate according to at least one embodiment of the present disclosure.

As shown in FIG. 33A, the fourth driving circuit includes a fourth output sub-circuit, and the fourth output sub-circuit includes a fourth driving transistor T42 and a fourth driving reset transistor T41;

The fourth driving circuit further includes a thirty-seventh transistor T37, a thirty-eighth transistor T38, a thirty-ninth transistor T39, a fortieth transistor T40, a forty-third transistor T43, a forty-fourth transistors T44, a forty-fifth transistor T45, a forty-sixth transistor T46, a ninth capacitor C9 and a tenth capacitor C10;

The gate electrode of T37 is electrically connected to the first clock signal terminal GCK1, the first electrode of T37 is electrically connected to the fourth input terminal I4, and the second electrode of T37 is electrically connected to the first electrode of T38;

The gate electrode of T38 is electrically connected to the gate electrode of T37, and the second electrode of T38 is electrically connected to the gate electrode of T42;

The gate electrode of T39 is electrically connected to the third clock signal terminal GCK3, the first electrode of T39 is electrically connected to the first voltage terminal VGL_G, and the second electrode of T39 is electrically connected to the gate electrode G41 of T41;

The gate electrode of T40 is electrically connected to the fourth input terminal I4, the first electrode of T40 is electrically connected to the second voltage terminal VGH_G, and the second electrode of T40 is electrically connected to the gate electrode G41 of T41;

The gate electrode of T41 is electrically connected to the first electrode of C10, the first electrode of T41 is electrically connected to the second voltage terminal VGH_G, and the second electrode of T41 is electrically connected to the fourth driving signal output terminal O4;

The gate electrode of T42 is electrically connected to the first electrode of C9, the first electrode of T42 is electrically connected to the fourth driving signal output terminal O4; the second electrode of T42 is electrically connected to the second clock signal terminal GCK2;

The gate electrode of T43 is electrically connected to the gate electrode of T41, the first electrode of T43 is electrically connected to the second voltage terminal VGH_G, and the second electrode of T43 is electrically connected to the first electrode of T44;

The gate electrode of T44 is electrically connected to the second electrode of T40; the second electrode of T44 is electrically connected to the gate electrode of T42;

The gate electrode of T45 is electrically connected to the fourth driving signal output terminal O4, the first electrode of T45 is electrically connected to the second clock signal terminal GCK2, and the second electrode of T45 is electrically connected to the second electrode D37 of T37;

The gate electrode of T46 is electrically connected to the gate electrode of T42, the first electrode of T46 is electrically connected to the second electrode of T43, and the second electrode of T46 is electrically connected to the first voltage terminal VGL_G;

The second electrode plate of C9 is electrically connected to the fourth driving signal output terminal O4, and the second electrode plate of C10 is electrically connected to the second voltage terminal VGH_G.

Figure 33B:
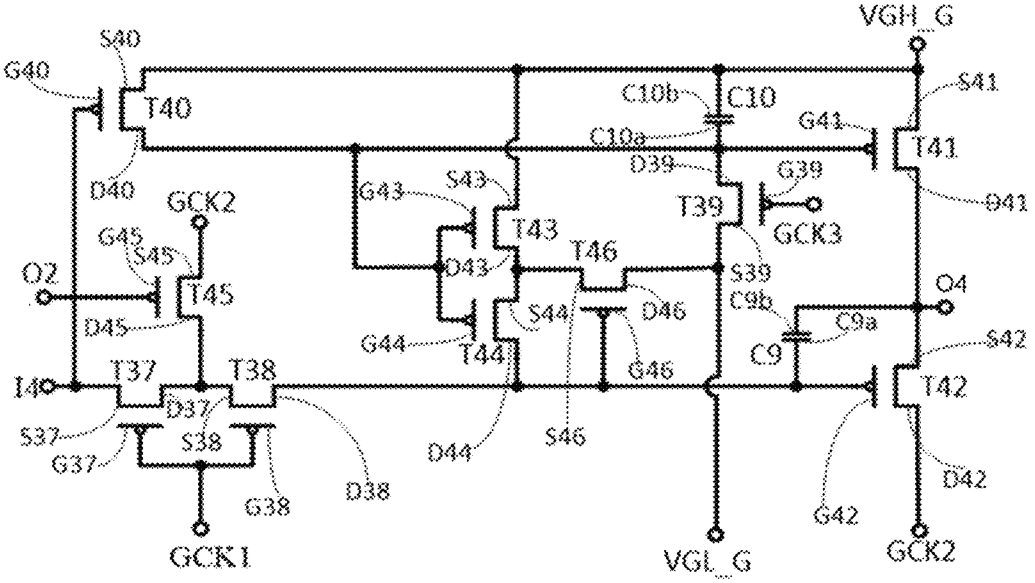
FIG. 33B is a circuit diagram of a fourth driving circuit in the display substrate according to at least one embodiment of the present disclosure.

As shown in FIG. 33B, at least one embodiment of the fourth driving circuit includes a fourth output sub-circuit, and the fourth output sub-circuit includes a fourth driving transistor T42 and a fourth driving reset transistor T41;

At least one embodiment of the fourth driving circuit further includes a thirty-seventh transistor T37, a thirty-eighth transistor T38, a thirty-ninth transistor T39, a fortieth transistor T40, a forty-third transistor T43, a forty-fourth transistor T44, a forty-fifth transistor T45, a forty-sixth transistor T46, a ninth capacitor C9 and a tenth capacitor C10;

The gate electrode G37 of T37 is electrically connected to the first clock signal terminal GCK1, the first electrode S37 of T37 is electrically connected to the fourth input terminal I4, and the second electrode D37 of T37 is electrically connected to the first electrode S38 of T38;

The gate electrode G38 of T38 is electrically connected to the gate electrode G37 of T37, and the second electrode D38 of T38 is electrically connected to the gate electrode G42 of T42;

The gate electrode G39 of T39 is electrically connected to the third clock signal terminal GCK3, the first electrode S39 of T39 is electrically connected to the first voltage terminal VGL_G, and the second electrode D39 of T39 is electrically connected to the gate electrode G41 of T41;

The gate electrode G40 of T40 is electrically connected to the fourth input terminal I4, the first electrode S40 of T40 is electrically connected to the second voltage terminal VGH_G, and the second electrode D40 of T40 is electrically connected to the gate electrode G41 of T41;

The gate electrode G41 of T41 is electrically connected to the first electrode plate C10*a* of C10, the first electrode S41 of T41 is electrically connected to the second voltage terminal VGH_G, and the second electrode D41 of T41 is electrically connected to the fourth driving signal output terminal O4;

The gate electrode G42 of T42 is electrically connected to the first electrode plate C9*a* of C9, the first electrode S42 of T42 is electrically connected to the fourth driving signal output terminal O4; the second electrode D42 of T42 is electrically connected to the second clock signal terminal GCK2;

The gate electrode G43 of T43 is electrically connected to the gate electrode G411 of T41, the first electrode S43 of T43 is electrically connected to the second voltage terminal VGH_G, and the second electrode D43 of T43 is electrically connected to the first electrode S44 of T44;

The gate electrode G44 of T44 is electrically connected to the second electrode D40 of T40; the second electrode D44 of T44 is electrically connected to the gate electrode G42 of T42;

The gate electrode G45 of T45 is electrically connected to the fourth driving signal output terminal O4, the first electrode S45 of T45 is electrically connected to the second clock signal terminal GCK2, and the second electrode D45 of T45 is electrically connected to the second electrode D37 of T37;

The gate electrode G46 of T46 is electrically connected to the gate electrode G42 of T42, the first electrode S46 of T46 is electrically connected to the second electrode D43 of T43, and the second electrode D46 of T46 is electrically connected to the first voltage terminal VGL_G;

The second electrode plate C9*b* of C9 is electrically connected to the fourth driving signal output terminal O4, and the second electrode plate C10*b* of C10 is electrically connected to the second voltage terminal VGH_G.

In at least one embodiment of the fourth driving circuit shown in FIG. 33A and FIG. 33B, all transistors are P-type transistors, but not limited thereto.

Figure 34:
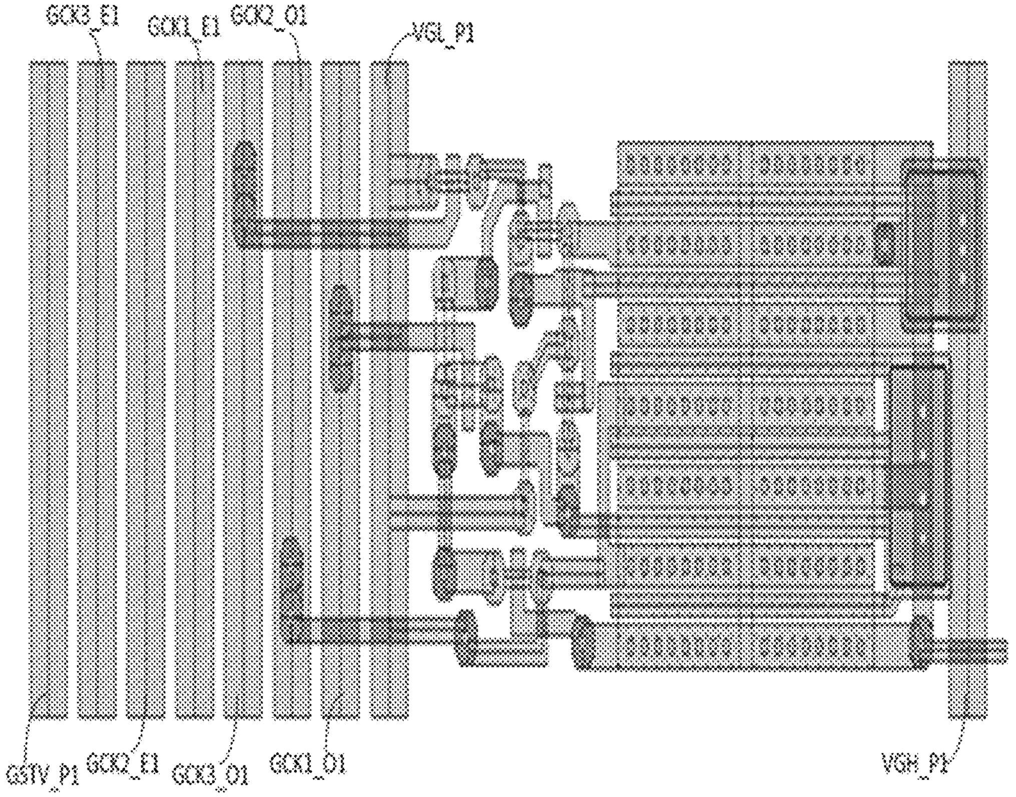
FIG. 34 is a layout diagram corresponding to at least one embodiment of the fourth driving circuit shown in FIG. 33B.
Figure 35:
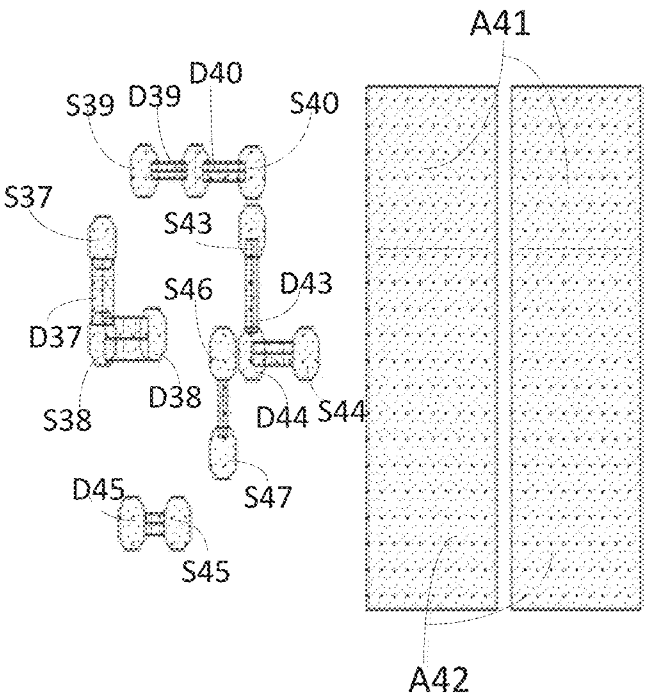
FIG. 35 is a layout diagram of the semiconductor layer in FIG. 34.
Figure 37:
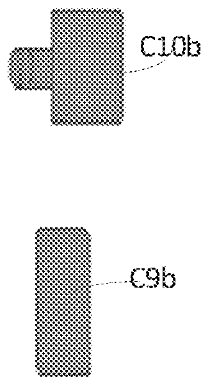
FIG. 37 is a layout diagram of the second gate metal layer in FIG. 34.
Figure 38:
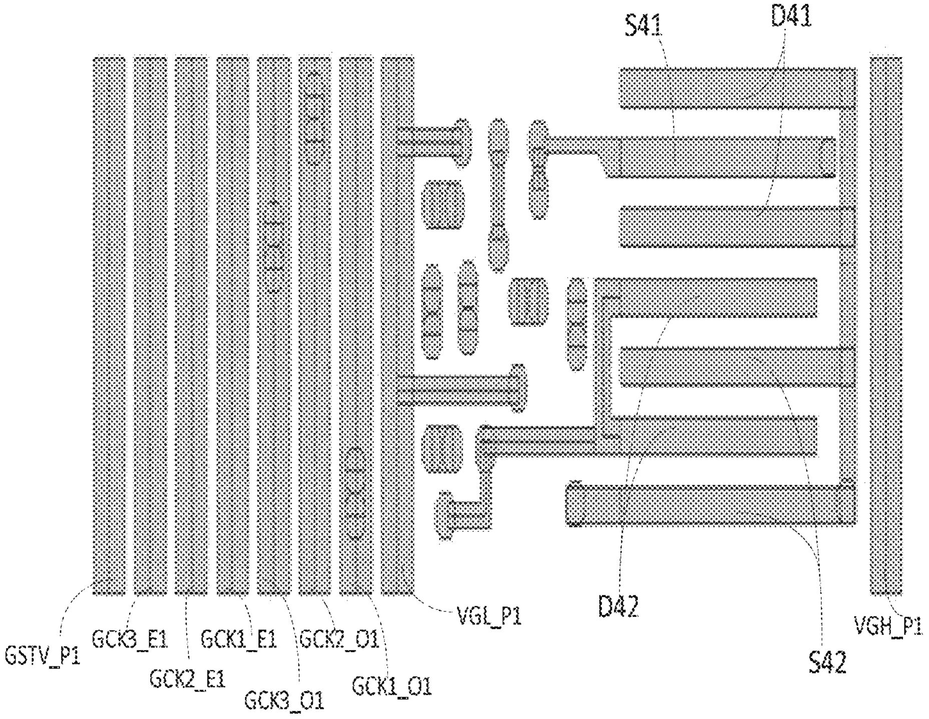
FIG. 38 is a layout diagram of the first metal layer in FIG. 34.

FIG. 34 is a layout diagram corresponding to the fourth driving circuit shown in FIG. 33B. FIG. 35 is a layout diagram of the semiconductor layer in FIG. 34, FIG. 36 is a layout diagram of the first gate metal layer in FIG. 34, FIG. 37 is a layout diagram of the second gate metal layer in FIG. 34, and FIG. 38 is a layout diagram of the first metal layer in FIG. 34.

Figure 39:
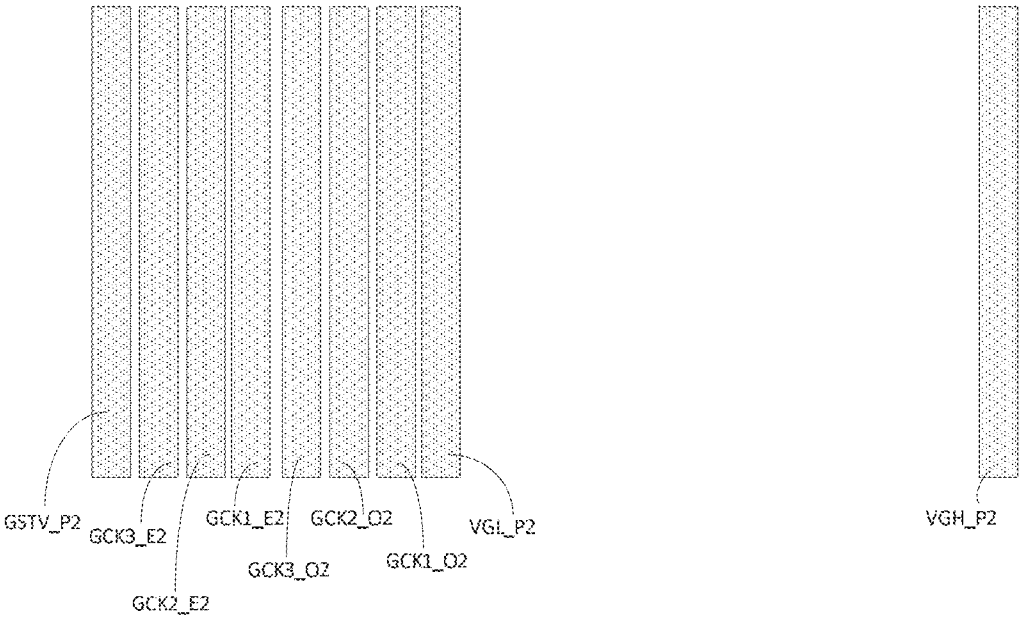
FIG. 39 is a layout diagram of a second metal layer added on the layout diagram shown in FIG. 34.

On the basis of the layout diagram of FIG. 34, the display substrate may further include a second metal layer. FIG. 39 is a layout diagram of the added second metal layer.

In FIG. 35, the one labeled A41 is the active layer of T41, the one labeled A42 is the active layer of T42, S37 is the first electrode of T37, D37 is the second electrode of T37, and S38 is the first electrode of T38. D38 is the second electrode of T38, S39 is the first electrode of T39, D39 is the second electrode of T39, S40 is the first electrode of T40, D40 is the second electrode of T40, S43 is the first electrode of T43, D43 is the second electrode of T43, S44 is the first electrode of T44, D44 is the second electrode of T44, S45 is the first electrode of T45, D45 is the second electrode of T45, S46 is the first electrode of T46, D46 is the second electrode of T46.

Figure 36:
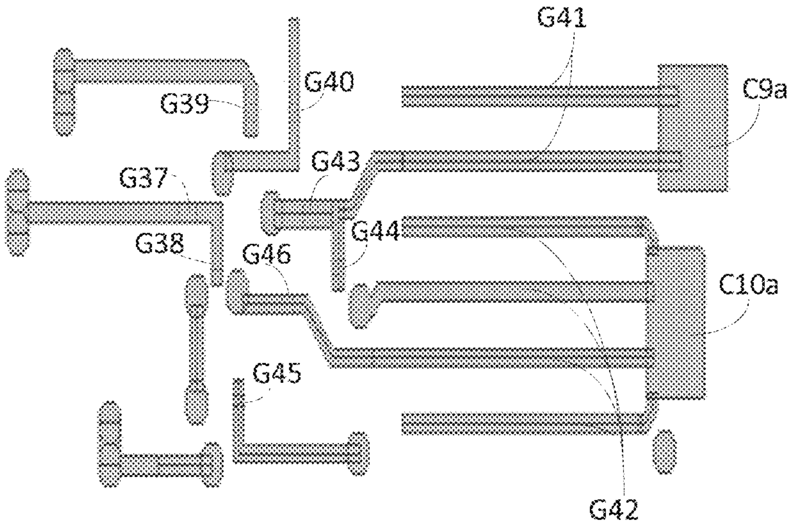
FIG. 36 is a layout diagram of the first gate metal layer in FIG. 34.

In FIG. 36, the one labeled G37 is the gate electrode of T37, the one labeled G38 is the gate electrode of T38, the one labeled G39 is the gate electrode of T39, the one labeled G40 is the gate electrode of T40, the one labeled G41 is the gate electrode of T41, the one labeled G42 is the gate electrode of T42, the one labeled G43 is the gate electrode of T43, the one labeled G44 is the gate electrode of T44, the one labeled G45 is the gate electrode of T45, the one labeled G45 is the gate electrode of T45; the one labeled C9*a* is the first electrode plate of C9, and the one labeled C10*a* is the first electrode plate of C10.

In FIG. 38, the one labeled C9*b* is the second electrode plate of C9, and the one labeled C10*b* is the second electrode plate of C10.

In FIG. 38, the one labeled S41 is the source electrode of T41, the one labeled D41 is the drain electrode of T41, the one labeled S42 is the source electrode of T42, and the one labeled D42 is the drain electrode of T42.

In FIG. 34 to FIG. 38, the one labeled GCK1_E1 is the first clock signal line in the first even-numbered row, the one labeled GCK2_E1 is the second clock signal line in the first even-numbered row, and the one labeled GCK3_E1 is the third clock signal line in the first even-numbered row, the one labeled GSTV_P1 is the first fourth start signal line, the one labeled VGL_P1 is the first third voltage line, the one labeled GCK1_O1 is the first clock signal line in the first odd-numbered row, and the one labeled GCK2_O1 is the second clock signal line in the first odd-numbered row, the one labeled GCK3_O1 is the third clock signal line in the first odd-numbered row; the one labeled VGH_P1 is the first fourth voltage line;

As shown in FIG. 39, the one labeled GCK1_E2 is the first clock signal line in the second even-numbered row, the one labeled GCK2_E2 is the second clock signal line in the second even-numbered row, the one labeled GCK3_E2 is the third clock signal line in the second even-numbered row, the one labeled GSTV_P2 is the second fourth start signal line, the one labeled VGL_P2 is the second third voltage line, the one labeled GCK1_O2 is the first clock signal line in the second odd-numbered row, and the one labeled GCK2_O2 is the second clock signal line in the second odd-numbered, the one labeled GCK3_O2 is the third clock signal line in the second odd-numbered row; the one labeled VGH_P2 is the second fourth voltage line.

In the embodiment corresponding to FIG. 34, in the fourth driving circuit, the first voltage terminal VGL_G is electrically connected to the first third voltage line VGL_P1, and the second voltage terminal VGH_G is electrically connected to the first fourth voltage line VGH_P1;

In the fourth driving circuit in the even-numbered row, the first clock signal terminal GCK1 is electrically connected to the first clock signal line GCK1_E1 in the first even-numbered row, the second clock signal terminal GCK2 is electrically connected to the second clock signal line GCK2_E1 in the first even-numbered row, and the second clock signal terminal GCK2 is electrically connected to the second clock signal line GCK2_E1 in the first even-numbered row, the third clock signal terminal GCK3 is electrically connected to the third clock signal line GCK3_E1 in the first even-numbered row;

In the fourth driving circuit in the odd-numbered row, the first clock signal terminal GCK1 is electrically connected to the first clock signal line GCK1_O1 in the first odd-numbered row, the second clock signal terminal GCK2 is electrically connected to the second clock signal line GCK2_O1 in the first odd-numbered row, and the second clock signal terminal GCK2 is electrically connected to the second clock signal line GCK2_O1 in the first odd-numbered row, the third clock signal terminal GCK3 is electrically connected to the third clock signal line GCK3_O1 in the first odd-numbered row.

In at least one embodiment of the present disclosure, the first clock signal line GCK1_E2 in the second even-numbered row is electrically connected to the first clock signal line GCK1_E1 in the first even-numbered row through a via hole, and the second clock signal line GCK2_E2 in the second even-numbered row is electrically connected to the second clock signal line GCK2_E1 in the first even-numbered row through the via hole, and the third clock signal line GCK3_E2 in the second even-numbered row is electrically connected with the third clock signal line GCK3_E1 in the first even-numbered row through the via hole to reduce the loading of each clock signal line;

The first clock signal line GCK1_O2 in the second odd-numbered row is electrically connected to the first clock signal line GCK1_O1 in the first odd-numbered row through a via hole, and the second clock signal line GCK2_O2 in the second odd-numbered row is connected to the second clock signal line GCK2_O1 in the first odd-numbered row through a via hole, and the third clock signal line GCK3_O2 in the second odd-numbered row is electrically connected with the third clock signal line GCK3_O1 in the first odd-numbered row through the via hole to reduce the loading of each clock signal line;

The second third voltage line VGL_P2 is electrically connected to the first third voltage line VGL_P1 through a via hole, so as to reduce the loading of the third voltage line;

The second fourth voltage line VGH_P2 is electrically connected to the first fourth voltage line VGH_P1 through a via hole, so as to reduce the loading of the fourth voltage line;

The second fourth start signal line GSTV_P2 is electrically connected to the first fourth start signal line GSTV_P1 through a via hole, so as to reduce the loading of each clock signal line.

In at least one embodiment of the present disclosure, on the basis of the layout diagram in FIG. 34, the display substrate may further include a second metal layer and a third metal layer, and the first clock signal line in the third even-numbered row, the second clock signal line in the third even-numbered row, the third clock signal line in the third even-numbered row, the first clock signal line in the third odd-numbered row, the second clock signal line in the third odd-numbered row, the third clock signal line in the third odd-numbered row and the third third voltage line and a third fourth voltage line may be provided on the third metal layer;

The first clock signal line in the third even-numbered row is electrically connected to the first clock signal line in the second even-numbered row through a via hole; the second clock signal line in the third even-numbered row is electrically connected to the second clock signal line in the second even-numbered row through a via hole; the third clock signal line in the third even-numbered row is electrically connected to the third clock signal line in the second even-numbered row through a via hole; the first clock signal line in the third odd-numbered row is electrically connected to the first clock signal line in the second odd-numbered row through a via hole; the second clock signal line in the third odd-numbered row is electrically connected to the second clock signal line in the second odd-numbered row through a via hole; the third clock signal line in the third odd-numbered row is electrically connected to the third clock signal line in the second odd-numbered row through a via hole; to reduce the loading of each clock signal line.

The third third voltage line is electrically connected to the second third voltage line through a via hole, so as to reduce the loading of the third voltage line;

The third fourth voltage line is electrically connected to the second fourth voltage line through the via hole, so as to reduce the loading of the fourth voltage line.

In at least one embodiment of the present disclosure, each third voltage line may be a low-voltage DC signal line, and each fourth voltage line may be a high-voltage DC signal line, but not limited thereto.

In at least one embodiment of the present disclosure, the orthographic projection of the first clock signal lines GCK1_E2 in the second even-numbered row on the base substrate at least partially overlaps the orthographic projection of the first clock signal line GCK1_E1 in the first even-numbered row on the base substrate, the orthographic projection of the second clock signal line GCK2_E2 in the second even-numbered row on the base substrate at least partially overlaps the orthographic projection of the second clock signal line GCK2_E1 in the first even-numbered row on the base substrate, and the orthographic projection of third clock signal line GCK3_E2 in the second even-numbered row on the base substrate at least partially overlaps the orthographic projection of the third clock signal line GCK3_E1 in the first even-numbered row on the base substrate;

The orthographic projection of the first clock signal line GCK1_O2 in the second odd-numbered row on the base substrate at least partially overlaps the orthographic projection of the first clock signal line GCK1_O1 in the first odd-numbered row on the base substrate, and the orthographic projection of the second clock signal line GCK2_O2 in second odd-numbered row on the base substrate at least partially overlaps the orthographic projection of the second clock signal line GCK2_O1 in the first odd-numbered row on the base substrate, and the orthographic projection of the third clock signal line GCK3_O2 in the second odd-numbered row on the base substrate at least partially overlaps the orthographic projection of the third clock signal line GCK3_O1 in the first odd-numbered row on the base substrate;

The orthographic projection of the second third voltage line VGL_P2 on the base substrate at least partially overlaps the orthographic projection of the first third voltage line VGL_P1 on the base substrate;

The orthographic projection of the second fourth voltage line VGH_P2 on the base substrate at least partially overlaps the orthographic projection of the first fourth voltage line VGH_P1 on the base substrate;

The orthographic projection of the second fourth start signal line GSTV_P2 on the base substrate at least partially overlaps the orthographic projection of the first fourth start signal line GSTV_P1 on the base substrate.

Figure 40:
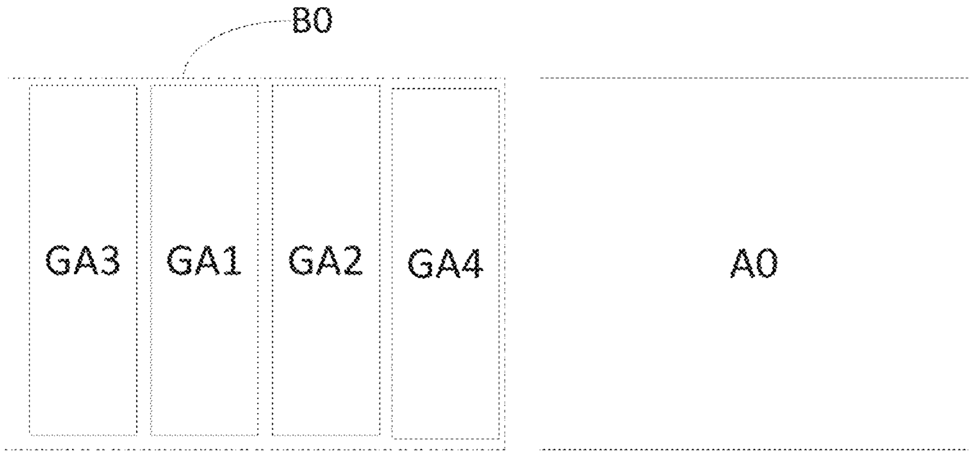
FIG. 40 is a structural diagram of a display substrate according to at least one embodiment of the present disclosure.

As shown in FIG. 40, the base substrate includes a peripheral area B0 and a display area A0;

The first driving unit GA1, the second driving unit GA2, the third driving unit GA3 and the fourth driving unit GA4 are all arranged in the peripheral area B0;

The third driving unit GA3, the first driving unit GA1, the second driving unit GA2 and the fourth driving unit GA4 are arranged in sequence along a direction close to the display area A0.

Figure 41:
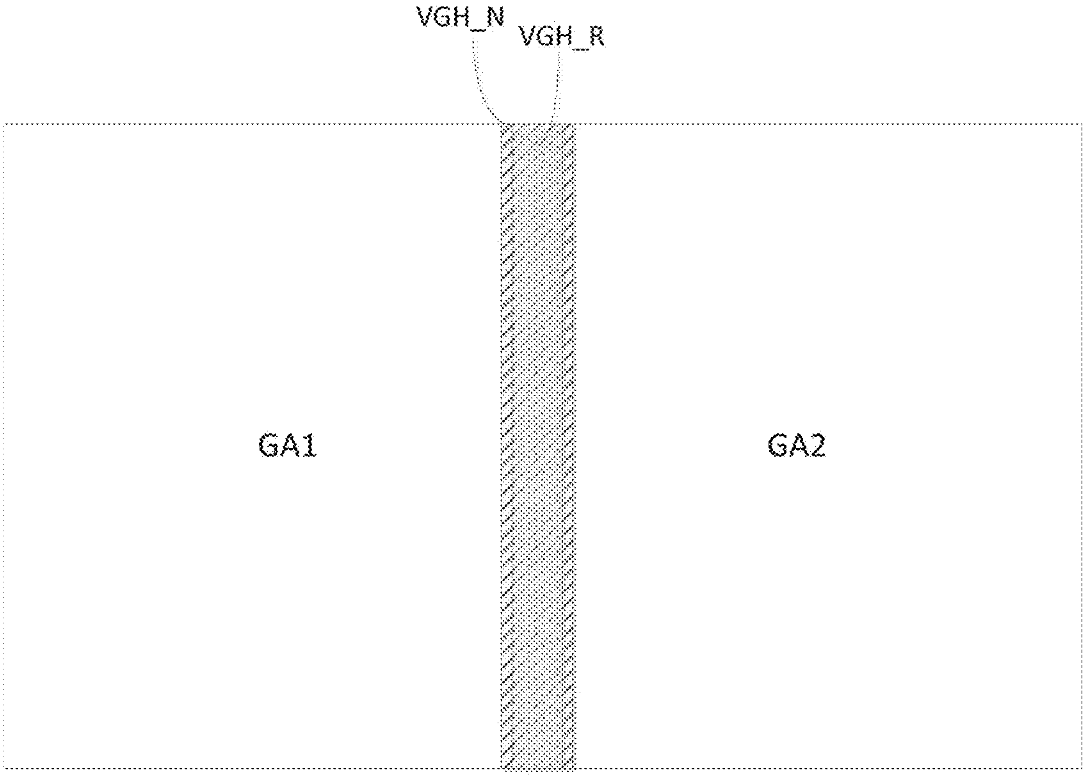
FIG. 41 is a structural diagram of a display substrate according to at least one embodiment of the present disclosure.

As shown in FIG. 41, the first driving unit GA1 includes a first second voltage line VGH_N, and the second driving unit GA2 includes a second second voltage line VGH_R;

the orthographic projection of VGH_N on the base substrate at least partially overlaps an orthographic projection of VGH_R on the base substrate;

VGH_N can be arranged on the second metal layer, and VGH_R can be arranged on the third metal layer, but not limited thereto.

In at least one embodiment of the present disclosure, the first signal line is VGH_N, and the second signal line is VGH_R, but not limited thereto.

Figure 42:
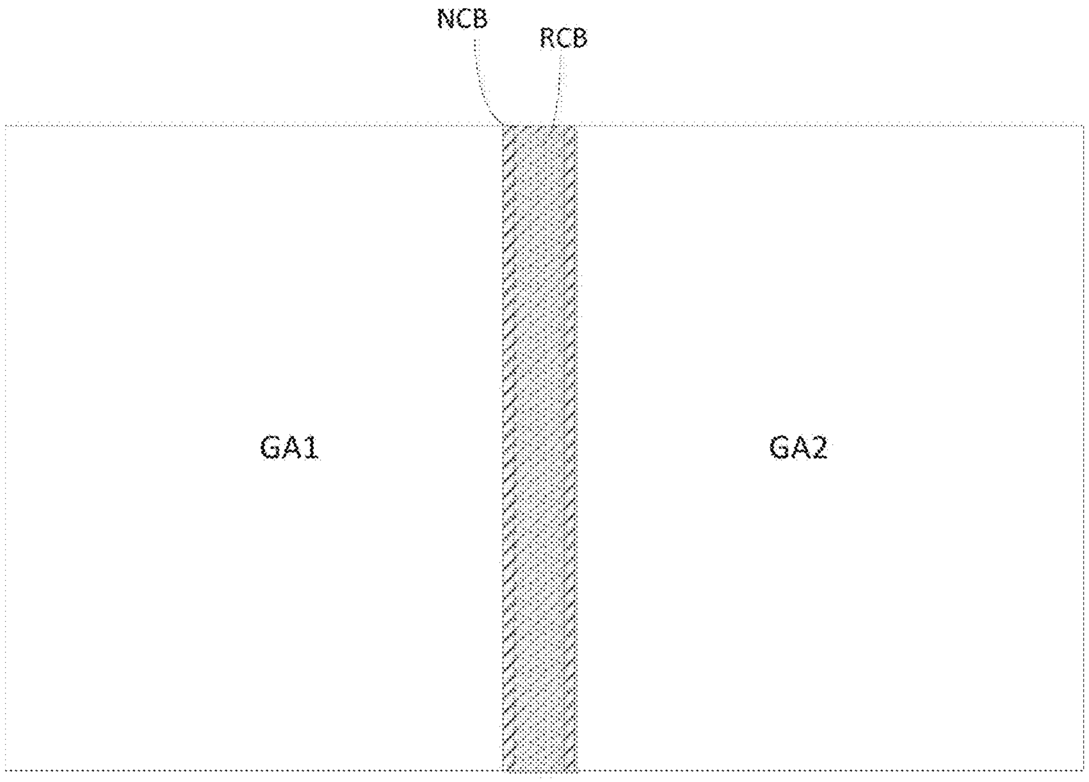
FIG. 42 is a structural diagram of a display substrate according to at least one embodiment of the present disclosure.

In at least one embodiment shown in FIG. 41, both VGH_N and VGH_R may be configured to provide high-voltage DC signals, and VGH_N and VGH_R are arranged on different metal layers. As shown in FIG. 42, the first driving unit GA1 includes a first second clock signal line NCB, and the second driving unit GA2 includes a second second clock signal line RCB;

an orthographic projection of the NCB on the base substrate at least partially overlaps an orthographic projection of the RCB on the base substrate;

NCB can be arranged on the second metal layer, and RCB can be arranged on the third metal layer, but not limited thereto.

In at least one embodiment shown in FIG. 42, the NCB can be configured to provide a clock signal, and the RCB can be configured to provide a clock signal, and the NCB and RCB are arranged on different metal layers.

In at least one embodiment of the present disclosure, the first signal line is NCB, and the second signal line is RCB, but not limited thereto.

Figure 43:
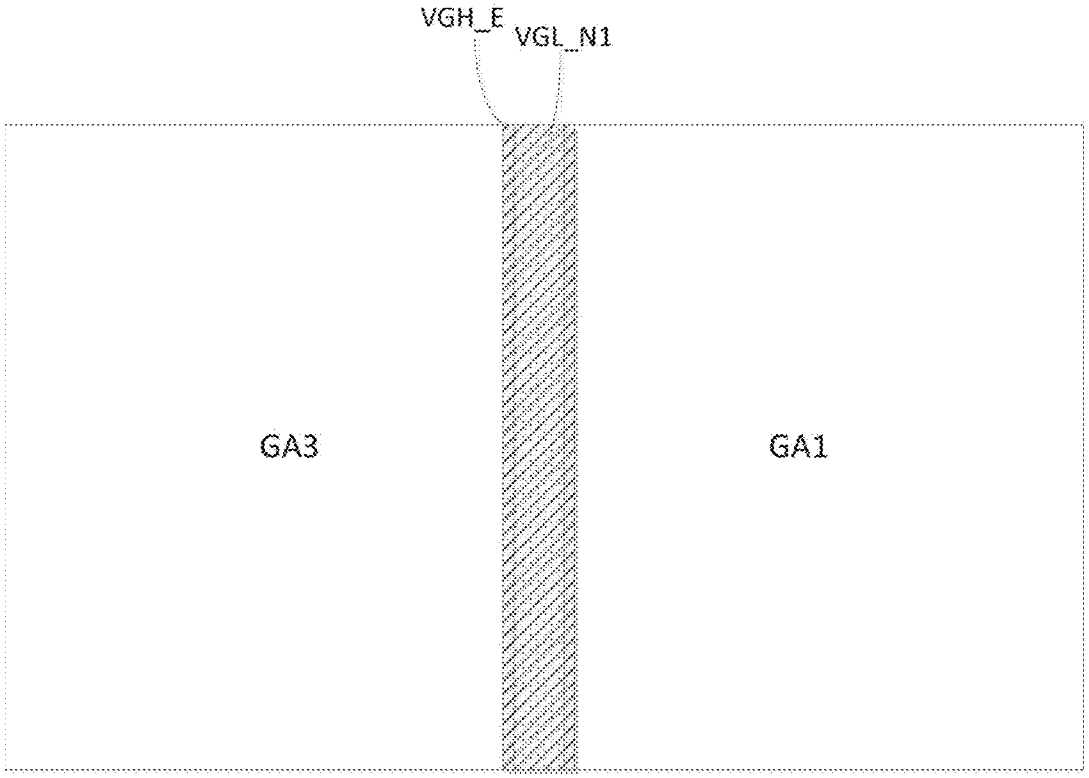
FIG. 43 is a structural diagram of a display substrate according to at least one embodiment of the present disclosure.

As shown in FIG. 43, the first driving unit GA1 includes a second first voltage line VGL_N1, and the third driving unit GA3 includes a third second voltage line VGH_E;

the orthographic projection of VGL_R on the base substrate at least partially overlaps the orthographic projection of VGH_E on the base substrate;

VGL_N1 can be arranged on the second metal layer, and VGH_E can be arranged on the third metal layer.

In at least one embodiment shown in FIG. 43, VGL_N1 can be configured as a low-voltage DC signal, VGH_E can be configured as a high-voltage DC signal, and VGL_N1 and VGH_E are arranged on different metal layers.

In at least one embodiment of the present disclosure, the first signal line is VGL_N1, and the second signal line is VGH_E, but not limited thereto.

The display device described in the embodiment of the present disclosure includes the above-mentioned display substrate.

The display device provided by the embodiments of the present disclosure may be any product or component with a display function, such as a mobile phone, a tablet computer, a television, a monitor, a notebook computer, a digital photo frame, a navigator, and the like.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display substrate, comprising a driving module arranged on a base substrate, wherein the driving module includes a plurality of driving units, and the driving unit includes a plurality of stages of driving circuit; the driving circuit is used to provide a driving signal;

the driving unit includes a first signal line, and the driving circuit includes an output sub-circuit configured to output the driving signal;

the display substrate includes at least two metal layers stacked along a direction away from the base substrate;

in at least one driving unit, an orthographic projection of the first signal line on the base substrate at least partially overlaps an orthographic projection of a first electrode of at least one transistor included in the output sub-circuit on the base substrate, the orthographic projection of the first signal line on the base substrate at least partially overlaps an orthographic projection of a second electrode of the at least one transistor included in the output sub-circuit on the base substrate;

the first electrode and the second electrode are arranged on a same metal layer, and the first electrode and the first signal line are arranged on different metal layers;

wherein the driving module includes a first driving unit; the first driving unit includes a plurality of stages of first driving circuits, and the first driving circuit is used to provide a first driving signal; the first driving unit includes a first first voltage line and a first second voltage line; the first driving circuit includes a first output sub-circuit; the first signal line is the first first voltage line;

the first output sub-circuit includes a first driving transistor and a first driving reset transistor;

a first electrode of the first driving transistor is electrically connected to the first second voltage line, a second electrode of the first driving transistor is electrically connected to a first electrode of the first driving reset transistor, and a second electrode of the first driving reset transistor is electrically connected to the first first voltage line;

the display substrate includes a first metal layer and a second metal layer sequentially stacked along a direction away from the base substrate; the first electrode of the first driving transistor, the second electrode of the first driving transistor, the first electrode of the first driving reset transistor and the second electrode of the first driving reset transistor are both arranged on the first metal layer, and the first first voltage line is arranged on the second metal layer;

an orthographic projection of the first electrode of the first driving transistor on the base substrate at least partially overlaps the orthographic projection of the first first voltage line on the base substrate; an orthographic projection of the second electrode of the first driving transistor on the base substrate at least partially overlaps the orthographic projection of the first first voltage line on the base substrate; an orthographic projection of the first electrode of the first driving reset transistor on the base substrate at least partially overlaps the orthographic projection of the first first voltage line on the base substrate; an orthographic projection of the second electrode of the first driving reset transistor on the base substrate at least partially overlaps the orthographic projection of the first first voltage line on the base substrate.

2. The display substrate according to claim 1, wherein an orthographic projection of a first signal line included in one driving circuit of the plurality of driving units on the base substrate at least partially overlaps an orthographic projection of a second signal line included in another driving unit of the plurality of driving units on the base substrate.

3. The display substrate according to claim 2, wherein the first signal line and the second signal line are configured to provide a same signal.

4. The display substrate according to claim 2, wherein the first signal line is a low voltage DC signal line, a high voltage DC signal line or a clock signal line;

the second signal line is a low voltage DC signal line, a high voltage DC signal line or a clock signal line.

5. The display substrate according to claim 1, wherein among the plurality of driving units, orthographic projections of at least three signal lines on the base substrate at least partially overlap.

6. The display substrate according to claim 1, wherein the driving module includes a first driving unit; the first driving unit includes a plurality of stages of first driving circuits, and the first driving circuit is used to provide a first driving signal; the first driving unit includes a first first voltage line and a first second voltage line; the first driving circuit includes a first output sub-circuit; the first signal line is the first first voltage line;

the first output sub-circuit includes a first driving transistor and a first driving reset transistor;

a first electrode of the first driving transistor is electrically connected to the first second voltage line, a second electrode of the first driving transistor is electrically connected to a first electrode of the first driving reset transistor, and a second electrode of the first driving reset transistor is electrically connected to the first first voltage line;

the display substrate includes a first metal layer, a second metal layer and a third metal layer which are sequentially stacked along a direction away from the base substrate; the first electrode of the first driving transistor, the second electrode of the first driving transistor, the first electrode of the first driving reset transistor, and the second electrode of the first driving reset transistor are all arranged on the first metal layer, and the first first voltage line is arranged on the third metal layer;

an orthographic projection of the first electrode of the first driving transistor on the base substrate at least partially overlaps the orthographic projection of the first first voltage line on the base substrate; an orthographic projection of the second electrode of the first driving transistor on the base substrate at least partially overlaps the orthographic projection of the first first voltage line on the base substrate; an orthographic projection of the first electrode of the first driving reset transistor on the base substrate at least partially overlaps the orthographic projection of the first first voltage line on the base substrate; an orthographic projection of the second electrode of the first driving reset transistor on the base substrate at least partially overlaps with the orthographic projection of the first first voltage line on the base substrate.

7. The display substrate according to claim 1, wherein the first driving unit further includes a second first voltage line, a first first clock signal line, a first second clock signal line, a first second voltage line, a first start signal line and a first reset line;

the first first clock signal line, the first second clock signal line and the first reset line are all arranged on the first metal layer;

the second first voltage line, the first start signal line and the first second voltage line are all arranged on the second metal layer.

8. The display substrate according to claim 7, wherein the first driving circuit includes a first on-off control transistor and a second on-off control transistor;

both a gate electrode of the first on-off control transistor and a gate electrode of the second on-off transistor are electrically connected to the second first voltage line;

at least part of an orthographic projection of the second first voltage line on the base substrate is arranged between an orthographic projection of the gate electrode of the first on-off control transistor on the base substrate and an orthographic projection of a gate electrode of the second on-off control transistor on the base substrate, wherein an orthographic projection of the first start signal line on the base substrate is arranged between an orthographic projection of the second first voltage line on the base substrate and an orthographic projection of the first reset line on the base substrate.

9. The display substrate according to claim 1, wherein the driving module includes a second driving unit; the first driving unit includes a plurality of stages of second driving circuits, and the second driving circuit is configured to provide a second driving signal; the second driving unit includes a third first voltage line; the second driving circuit includes a second output sub-circuit; the second output sub-circuit includes a second driving transistor;

an orthographic projection of the third first voltage line on the base substrate is arranged on a side of an orthographic projection of the second driving transistor on the base substrate away from a display area;

the third first voltage line and the first first voltage line are arranged on different layers;

an orthographic projection of the third first voltage line on the base substrate at least partially overlaps the orthographic projection of the first first voltage line on the base substrate.

10. The display substrate according to claim 9, wherein the orthographic projection of the third first voltage line on the base substrate coincides with the orthographic projection of the first first voltage line on the base substrate, or wherein the first driving circuit is configured to provide an N-type gate driving signal, and the second driving circuit is configured to provide a reset control signal.

11. The display substrate according to claim 9, wherein the first first voltage line is arranged on the second metal layer, and the third first voltage line is arranged on the third metal layer; or, the first first voltage line is arranged on the third metal layer, and the third first voltage line is arranged on the second metal layer, wherein the first first voltage line and the third first voltage line are low-voltage DC signal lines; or, the first first voltage line and the third first voltage line are high-voltage DC signal lines.

12. The display substrate according to claim 9, wherein the second output sub-circuit is arranged adjacent to the third first voltage line.

13. The display substrate according to claim 9, wherein the second driving unit further comprises a second start signal line, a second first clock signal line, a second second clock signal line and a second second voltage line;

the third first voltage line, the second start signal line, the second first clock signal line, the second second clock signal line and the second second voltage line are arranged in sequence along a direction close to the display area.

14. The display substrate according to claim 13, wherein the second output sub-circuit further includes a second driving reset transistor;

an orthographic projection of the second start signal line on the base substrate at least partially overlaps the orthographic projection of the first electrode of the second driving transistor on the base substrate, and the orthographic projection of the second start signal line on the base substrate at least partially overlaps the orthographic projection of the second electrode of the second driving transistor on the base substrate;

the orthographic projection of the second start signal line on the base substrate at least partially overlaps an orthographic projection of a first electrode of the second driving reset transistor on the base substrate, and the orthographic projection of the second start signal line on the base substrate at least partially overlaps an orthographic projection of a second electrode of the second driving reset transistor on the base substrate.

15. The display substrate according to claim 13, wherein an orthographic projection of a transistor included in the second driving circuit on the base substrate is arranged at a side of an orthographic projection of the third first voltage line on the base substrate close to the display area.

16. The display substrate according to claim 14, wherein the second driving circuit further comprises a fifteenth transistor, a twentieth transistor, and a twenty-first transistor;

a gate electrode of the fifteenth transistor is electrically connected to the second first clock signal line, and a second electrode of the fifteenth transistor is electrically connected to a second electrode of the twenty-first transistor; a first electrode of the twenty-first transistor is electrically connected to a second electrode of the twentieth transistor;

a gate electrode of the twentieth transistor is electrically connected to the gate electrode of the second driving reset transistor, and a gate electrode of the twenty-first transistor is electrically connected to the second second clock signal line;

an orthographic projection of the gate electrode of the fifteenth transistor on the base substrate, an orthographic projection of the gate electrode of the twentieth transistor on the base substrate, and an orthographic projection of the gate electrode of the twenty-first transistor on the base substrate are arranged between the orthographic projection of the second second clock signal line on the base substrate and the orthographic projection of the second second voltage line on the base substrate, wherein the second driving circuit further comprises a sixteenth transistor;

a gate electrode of the sixteenth transistor is electrically connected to the second electrode of the fifteenth transistor, a first electrode of the sixteenth transistor is electrically connected to the second first clock signal line, and a second electrode of the sixteenth transistor is electrically connected to the gate electrode of the driving reset transistor;

an orthographic projection of the gate electrode of the sixteenth transistor on the base substrate is arranged between the orthographic projection of the second first clock signal line on the base substrate and the orthographic projection of the second second clock signal line on the base substrate.

17. The display substrate according to claim 9, wherein the base substrate includes a peripheral area and a display area; the driving units included in the driving module are all arranged in the peripheral area of the base substrate;

the first driving unit is arranged on a side of the second driving unit away from the display area.

18. The display substrate according to claim 17, wherein the driving module comprises a third driving unit, the third driving circuit includes a plurality of stages of third driving circuits, the third driving circuit is configured to provide a third driving signal, the third driving unit is arranged at a side of the first driving unit far away from the second driving unit, wherein the driving module comprises a fourth driving unit, the driving unit comprises a plurality of stages of fourth driving circuits, the fourth driving circuit is configured to provide a fourth driving signal;

the fourth driving unit is arranged on a side of the second driving unit close to the display area.

19. A display device comprising the display substrate according to claim 1.

20. A display substrate, comprising a driving module arranged on a base substrate, wherein the driving module includes a plurality of driving units, and the driving unit includes a plurality of stages of driving circuit; the driving circuit is used to provide a driving signal;

the driving unit includes a first signal line, and the driving circuit includes an output sub-circuit configured to output the driving signal;

the display substrate includes at least two metal layers stacked along a direction away from the base substrate;

in at least one driving unit, an orthographic projection of the first signal line on the base substrate at least partially overlaps an orthographic projection of a first electrode of at least one transistor included in the output sub-circuit on the base substrate, the orthographic projection of the first signal line on the base substrate at least partially overlaps an orthographic projection of a second electrode of the at least one transistor included in the output sub-circuit on the base substrate;

the first electrode and the second electrode are arranged on a same metal layer, and the first electrode and the first signal line are arranged on different metal layers;

wherein the driving module includes a first driving unit; the first driving unit includes a plurality of stages of first driving circuits, and the first driving circuit is used to provide a first driving signal; the first driving unit includes a first first voltage line and a first second voltage line; the first driving circuit includes a first output sub-circuit; the first signal line is the first first voltage line;

the first output sub-circuit includes a first driving transistor and a first driving reset transistor;

a first electrode of the first driving transistor is electrically connected to the first second voltage line, a second electrode of the first driving transistor is electrically connected to a first electrode of the first driving reset transistor, and a second electrode of the first driving reset transistor is electrically connected to the first first voltage line;

the display substrate includes a first metal layer, a second metal layer and a third metal layer which are sequentially stacked along a direction away from the base substrate; the first electrode of the first driving transistor, the second electrode of the first driving transistor, the first electrode of the first driving reset transistor, and the second electrode of the first driving reset transistor are all arranged on the first metal layer, and the first first voltage line is arranged on the third metal layer;

an orthographic projection of the first electrode of the first driving transistor on the base substrate at least partially overlaps the orthographic projection of the first first voltage line on the base substrate; an orthographic projection of the second electrode of the first driving transistor on the base substrate at least partially overlaps the orthographic projection of the first first voltage line on the base substrate; an orthographic projection of the first electrode of the first driving reset transistor on the base substrate at least partially overlaps the orthographic projection of the first first voltage line on the base substrate; an orthographic projection of the second electrode of the first driving reset transistor on the base substrate at least partially overlaps with the orthographic projection of the first first voltage line on the base substrate.

* * * * *